US012516229B2

(12) United States Patent
Yook

(10) Patent No.: US 12,516,229 B2
(45) Date of Patent: Jan. 6, 2026

(54) PRINTABLE SILICONE COMPOSITION AND METHODS FOR ITS PREPARATION AND USE

(71) Applicant: Dow Silicones Corporation, Midland, MI (US)

(72) Inventor: Juyoung Yook, Chungcheongbuk-do (KR)

(73) Assignee: Dow Silicones Corporation, Midland, MI (US)

( * ) Notice: Subject to any disclaimer, the term of this patent is extended or adjusted under 35 U.S.C. 154(b) by 396 days.

(21) Appl. No.: 18/249,995

(22) PCT Filed: Jan. 11, 2022

(86) PCT No.: PCT/US2022/011927
§ 371 (c)(1),
(2) Date: Apr. 21, 2023

(87) PCT Pub. No.: WO2022/169556
PCT Pub. Date: Aug. 11, 2022

(65) Prior Publication Data
US 2023/0407012 A1 Dec. 21, 2023

Related U.S. Application Data

(60) Provisional application No. 63/144,504, filed on Feb. 2, 2021.

(51) Int. Cl.
| | | |
|---|---|---|
| *C09J 183/04* | (2006.01) | |
| *C08G 77/04* | (2006.01) | |
| *C09D 11/30* | (2014.01) | |
| *C09J 7/38* | (2018.01) | |
| *C08G 77/00* | (2006.01) | |
| *C08G 77/12* | (2006.01) | |
| *C08G 77/20* | (2006.01) | |

(52) U.S. Cl.
CPC .......... *C09J 183/04* (2013.01); *C08G 77/045* (2013.01); *C09D 11/30* (2013.01); *C09J 7/38* (2018.01); *C09J 7/383* (2018.01); *C08G 77/12* (2013.01); *C08G 77/20* (2013.01); *C08G 77/80* (2013.01)

(58) Field of Classification Search
CPC ............................... C08G 77/80; C08G 77/045
USPC .......................................................... 528/43
See application file for complete search history.

(56) References Cited

U.S. PATENT DOCUMENTS

| | | |
|---|---|---|
| 2,676,182 A | 4/1954 | Daudt et al. |
| 2,823,218 A | 2/1958 | Speir et al. |
| 3,159,601 A | 12/1964 | Ashby et al. |
| 3,220,972 A | 11/1965 | Lamoreaux et al. |
| 3,284,406 A | 11/1966 | Nelson |
| 3,296,291 A | 1/1967 | Scotia et al. |
| 3,419,593 A | 12/1968 | Willing et al. |
| 3,516,946 A | 6/1970 | Scotia et al. |
| 3,814,730 A | 6/1974 | Karstedt et al. |
| 3,928,629 A | 12/1975 | Chandra et al. |
| 3,957,713 A | 5/1976 | Jeram et al. |
| 3,989,668 A | 11/1976 | Lee et al. |
| 4,329,273 A | 5/1982 | Hardman et al. |
| 4,510,094 A | 4/1985 | Drahnak |
| 4,584,355 A | 4/1986 | Blizzard et al. |
| 4,585,836 A | 4/1986 | Homan et al. |
| 4,591,622 A | 5/1986 | Blizzard et al. |
| 4,600,484 A | 7/1986 | Drahnak |
| 4,611,042 A | 9/1986 | Rivers-Farrell et al. |
| 4,766,176 A | 8/1988 | Lee et al. |
| 4,772,515 A | 9/1988 | Hara et al. |
| 4,774,310 A | 9/1988 | Butler |
| 4,784,879 A | 11/1988 | Lee et al. |
| 4,916,169 A | 4/1990 | Boardman et al. |
| 5,017,654 A | 5/1991 | Togashi et al. |
| 5,036,117 A | 7/1991 | Chung et al. |
| 5,169,920 A | 12/1992 | Okawa |
| 5,175,325 A | 12/1992 | Brown et al. |
| 5,317,072 A | 5/1994 | Bokerman et al. |
| 5,420,222 A | 5/1995 | Stepp et al. |
| 6,046,250 A | 4/2000 | Boardman et al. |
| 6,127,446 A | 10/2000 | Butts |
| 6,376,569 B1 | 4/2002 | Oxman et al. |
| 6,451,869 B1 | 9/2002 | Butts |
| 6,605,734 B2 | 8/2003 | Roy et al. |
| 6,677,407 B1 | 1/2004 | Bilgrien et al. |
| 6,883,908 B2 | 4/2005 | Young et al. |
| 6,956,087 B2 | 10/2005 | Lai et al. |
| 7,687,591 B2 | 3/2010 | Bhagwagar et al. |
| 8,174,000 B2 | 5/2012 | Cheon et al. |
| 8,642,674 B2 | 2/2014 | Ikeno |
| 8,754,174 B2 | 6/2014 | Aoki et al. |
| 9,593,209 B2 | 3/2017 | Dent et al. |
| 2005/0154079 A1 | 7/2005 | Walker et al. |
| 2007/0025678 A1* | 2/2007 | Kushibiki ............... C08L 83/04 385/141 |

(Continued)

FOREIGN PATENT DOCUMENTS

| | | |
|---|---|---|
| CN | 104031602 | 9/2014 |
| CN | 101925608 | 4/2015 |
| EP | 0398701 | 11/1990 |
| EP | 0347895 | 11/1993 |
| EP | 3757186 | 12/2020 |
| JP | H0599862 | 4/1993 |
| JP | 03865638 | 1/2007 |
| JP | 5342830 | 11/2013 |
| WO | 2003085058 | 10/2003 |
| WO | 2017110468 | 6/2017 |

(Continued)

*Primary Examiner* — Marc S Zimmer
(74) *Attorney, Agent, or Firm* — Catherine U. Brown

(57) ABSTRACT

A curable silicone composition has viscosity≤100 mPa·s at 25° C. The composition is suitable for use in a printing method. The composition can cure via hydrosilylation reaction to form a silicone adhesive suitable for use in the field of (opto)electronic device fabrication.

14 Claims, 1 Drawing Sheet

(56) References Cited

U.S. PATENT DOCUMENTS

| | | | |
|---|---|---|---|
| 2007/0028777 A1 | | 2/2007 | Hoffman et al. |
| 2010/0015454 A1 | * | 1/2010 | Anderson ......... B32B 17/10174 |
| | | | 428/429 |
| 2011/0171400 A1 | | 7/2011 | Thompson et al. |
| 2012/0046426 A1 | * | 2/2012 | Fang ...................... C08F 10/00 |
| | | | 526/74 |
| 2016/0046843 A1 | | 2/2016 | Geddes et al. |
| 2019/0218346 A1 | * | 7/2019 | Nakagawa ........... H10H 20/854 |
| 2019/0292394 A1 | | 9/2019 | Linton et al. |
| 2019/0367744 A1 | | 12/2019 | Chevalier et al. |
| 2020/0048460 A1 | | 2/2020 | Yabuno et al. |

FOREIGN PATENT DOCUMENTS

| | | |
|---|---|---|
| WO | 2019230168 | 12/2019 |
| WO | 2020000389 | 1/2020 |
| WO | 2020071137 | 4/2020 |

* cited by examiner

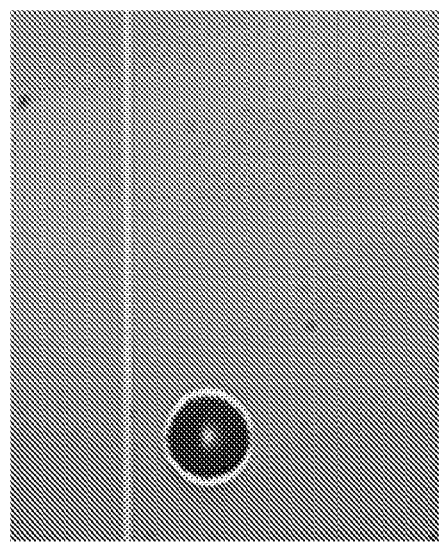

US 12,516,229 B2

PRINTABLE SILICONE COMPOSITION AND METHODS FOR ITS PREPARATION AND USE

CROSS REFERENCE TO RELATED APPLICATIONS

This application is a U.S. national stage filing under 35 U.S.C. § 371 of PCT Application No. PCT/US2022/011927 filed on 11 Jan. 2022, currently pending. which claims the benefit of U.S. Provisional Patent Application No. 63/144,504 filed 2 Feb. 2021 under 35 U.S.C. § 119 (e). PCT Application No. PCT/US2022/011927 and U.S. Provisional Patent Application No. 63/144,504 are each hereby incorporated by reference.

TECHNICAL FIELD

This invention pertains to a curable silicone composition with viscosity≤100 mPa·s. The composition is useful in an inkjet printing method for making an adhesive layer suitable for use in the field of (opto)electronic device fabrication.

INTRODUCTION

Conventional curable silicone compositions for forming silicone pressure sensitive adhesives typically contain a linear silicone gum (e.g., with viscosity higher than 1,000,000 mPa·s) and a solid tackifier resin consisting essentially of triorganosiloxane units (of formula $R_3SiO_{1/2}$, in which R represents a monovalent hydrocarbon group) and silicate (Q) units (of formula $SiO_{4/2}$). In addition to the above two ingredients, such silicone compositions may contain solvents to reduce viscosity when coating the curable silicone composition on a surface of a substrate to form a silicone pressure sensitive adhesive layer. However, the use of volatile solvents has several drawbacks. First, a solvent drying process is needed when using the composition, which is undesirable. And, solvent drying may cause non-uniformity of inkjet-printed layers or other features (e.g., non-uniform dot size and/or a layer with roughness), and/or shrinkage of dot size during solvent evaporation. Also, the use of volatile solvent is not preferred from an environmental standpoint.

Solventless silicone pressure sensitive adhesive compositions, which can be used to form silicone pressure sensitive layers by typical coating and curing methods have been disclosed. However, the viscosity at 25° C. of such a solventless silicone pressure sensitive adhesive composition is typically on the order of thousands of mPa·s or higher. For example, the compositions disclosed in U.S. Pat. No. 7,687,591 to Bhagwagar, et al. and in U.S. Pat. No. 8,754,174 to Aoki have high viscosities, rendering them unsuitable for use in an inkjet printing process.

In the field of (opto)electronic device fabrication, various pressure sensitive adhesives have been proposed for attaching two different layers or display parts in the device. In this field, a dry lamination method by using a pressure sensitive adhesive sheet has been widely applied. In addition, a dispensing method by using a liquid curable adhesive has also been proposed to form a layer on a target substrate. However, these methods have a limitation to fabricate thinner (opto)electronic devices because it is difficult to achieve a layer with a thickness≤50 μm.

SUMMARY

A curable silicone composition comprises:
(A) an aromatic compound having two alkenyl groups per molecule and a molecular weight less than 1,000 g/mol, in an amount of 10 parts by mass to 90 parts by mass;
(B) an aromatic compound having two silicon bonded hydrogen atoms per molecule and a molecular weight less than 1,000 g/mol, in an amount of 90 parts by mass to 10 parts by mass;
with the proviso that the amount of starting material (A) and the amount of starting material (B) combined=100 parts by mass;
(C) an alkenyl functional polyorganosilicate resin in an amount of 10 parts by mass to 130 parts by mass, per 100 parts by mass of starting material (A) and starting material (B) combined;
optionally (D) an alkenyl functional polydiorganosiloxane in an amount of 0 to 52.5 parts by mass, per 100 parts by mass of starting material (A) and starting material (B) combined;
optionally (E) a reactive diluent comprising a hydrocarbon compound of 8 to 18 carbon atoms with at least one aliphatically unsaturated group per molecule, in an amount of 0 to 25 parts by mass of starting material (A) and starting material (B) combined;
optionally (F) a polyorganohydrogensiloxane in an amount of 0 to 8 parts by mass, per 100 parts by mass of starting material (A) and starting material (B) combined;
with the provisos that starting materials (A), (B), (C), (D), (E), and (F) are present in amounts sufficient to provide a molar ratio of silicon bonded hydrogen atoms/alkenyl groups (SiH/Vi ratio) of 0.5/1 to 2/1 and an aryl content of 246 mmol/100 g to 450 mmol/100 g;
(G) a hydrosilylation reaction catalyst in an amount sufficient to provide 0.1 ppm to 5,000 ppm by mass of a platinum group metal, based on combined amounts of starting materials (A), (B), (C), (D), (E), (F), (G) and (H);
optionally (H) a hydrosilylation reaction inhibitor in an amount of 0 to 10,000 ppm by mass, based on combined amounts of starting materials (A), (B), (C), (D), (E), (F), (G) and (H).

BRIEF DESCRIPTION OF THE DRAWING

FIG. 1 shows an image of a drop of the curable silicone composition according to INV1 in Reference Example 6.

DETAILED DESCRIPTION

The curable silicone composition (composition) described above may have a maximum viscosity of 100 mPa·s measured by using a Brookfield DV1 VISCOMETER using a CPA-40Z spindle at 25° C. The starting materials used in the curable silicone composition are described in detail, as follows.

Starting Material (A)

Starting material (A) in the curable silicone composition is an aromatic compound having two alkenyl groups per molecule and a molecular weight less than 1,000 g/mol, alternatively less than 900 g/mol, alternatively less than 800 g/mol, alternatively less than 700 g/mol, alternatively less than 600 g/mol, alternatively less than 500 g/mol, and alternatively less than 400 g/mol. At the same time, molecular weight of starting material (A) may be at least 130 g/mol, alternatively at least 150 g/mol, alternatively at least 200 g/mol, and alternatively at least 300 g/mol. Alternatively, starting material (A) may have a molecular weight of 130 g/mol to 1,000 g/mol; alternatively 130 g/mol to 900 g/mol; alternatively 154 g/mol to 900 g/mol; and alternatively 130 g/mol to 400 g/mol, alternatively 130 g/mol to 320 g/mol; alternatively 130 g/mol to 250 g/mol. Starting material (A) may be selected from the group consisting of an organic compound of formula (A-I): $R^1—R^2—R^1$, a siloxane oligomer of formula (A-II):

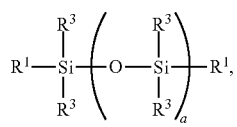

and a combination of both the organic compound of formula (A-I) and the siloxane oligomer of formula (A-II). In formulas (A-I) and (A-II), each $R^1$ is an independently selected alkenyl group of 2 to 12 carbon atoms, each $R^2$ is an arylene group of 6 to 20 carbon atoms, each $R^3$ is independently selected from the group consisting of an alkyl group of 1 to 12 carbon atoms and an aryl group of 6 to 20 carbon atoms, with the proviso that 15 mole % to 50 mole % of all instances of $R^3$ are aryl groups and 50 mole % to 85 mole % of all instances of $R^3$ are alkyl groups; and subscript a is an integer with a value of 2 to 3. Suitable alkenyl groups for $R^1$ are exemplified by vinyl, allyl, and hexenyl; alternatively vinyl and hexenyl; and alternatively vinyl. Suitable arylene groups for $R^2$ include phenylene, naphthalene, and biphenylene; alternatively phenylene. Alternatively, each $R^2$ may be a phenylene independently selected from the group consisting of

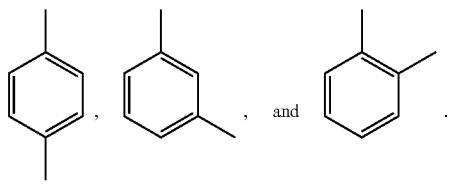

Suitable alkyl groups for $R^3$ include methyl, ethyl, propyl (including iso-propyl and n-propyl), butyl (including iso-butyl, n-butyl, sec-butyl, and tert-butyl), pentyl (including cyclopentyl and linear and branched alkyl groups with 5 carbon atoms), hexyl (including cyclohexyl and linear and branched alkyl groups with 6 carbon atoms). Alternatively, the alkyl group for $R^3$ may be selected from the group consisting of methyl and ethyl, alternatively methyl. Suitable aryl groups for $R^3$ may include phenyl, tolyl, xylyl, naphthyl, benzyl, and 2-phenylethyl. Alternatively, the aryl group for $R^3$ may be phenyl. Alternatively, each $R^3$ may be selected from the group consisting of methyl and phenyl.

Compounds of formula (A-I) are known in the art and are commercially available. For example, (A-I-1) divinyl benzene of formula

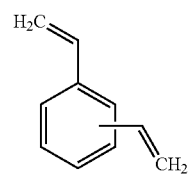

(including m-divinyl benzene, o-divinyl benzene, and p-divinylbenzene, and a combination thereof) and (A-I-2) diallyl benzene of formula

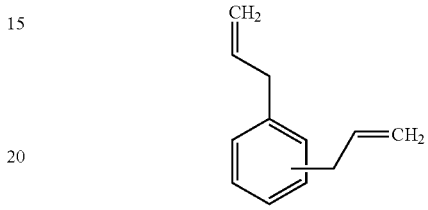

(including m-diallyl benzene, o-diallyl benzene, and p-diallyl benzene, and a combination thereof) are commercially available from Gelest, Inc. of Morrisville, Pennsylvania, USA and Sigma-Aldrich, Inc. of St. Louis, Missouri, USA. Compounds of formula (A-II) are also known in the art and are commercially available. For example, (A-II-1) 1,5-divinyl-3,3-diphenyl-1,1,5,5-tetramethyltrisiloxane of formula

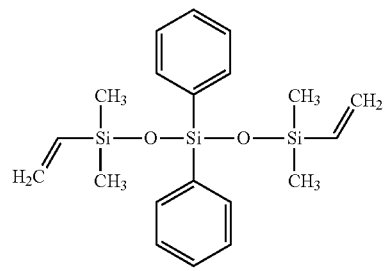 [SMILES: C=C[Si](C)(C)O[Si](O[Si](C)(C)C=C)(c1ccccc1)c1ccccc1]

(384 g/mol); and (A-II-2) 1,5-divinyl-3-phenylpentamethyltrisiloxane of formula

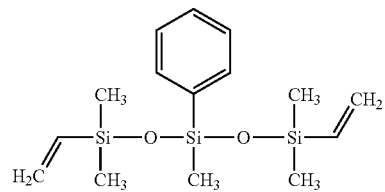 [SMILES: C=C[Si](C)(C)O[Si](C)(O[Si](C)(C)C=C)c1ccccc1]

(323 g/mol) are also known in the art and are commercially available from various sources such as Gelest, Inc. and Sigma-Aldrich, Inc.

Starting material (A) may be one compound or a combination of two or more of the compounds described above. For example, starting material (A) may be a combination of (A-I-1) divinyl benzene and (A-I-2) diallyl benzene. Alternatively, starting material (A) may be a combination of (A-II-1) 1,5-divinyl-3,3-diphenyl-1,1,5,5-tetramethyltrisiloxane and (A-II-2) 1,5-divinyl-3-phenylpentamethyltrisiloxane. Alternatively, starting material (A) may be a combination of (A-I-1) divinyl benzene and (A-II-1) 1,5-divinyl-3,3-diphenyl-1,1,5,5-tetramethyltrisiloxane. Alternatively, starting material (A) may be a combination of (A-I-1) divinyl benzene and (A-II-2) 1,5-divinyl-3-phenylpentamethyltrisiloxane. Alternatively, starting material (A) may be a combination of (A-I-2) diallyl benzene and (A-II-1) 1,5-divinyl-3,3-diphenyl-1,1,5,5-tetramethyltrisiloxane. Alternatively, starting material (A) may be a combination of (A-I-2) diallyl benzene and (A-II-2) 1,5-divinyl-3-phenylpentamethyltrisiloxane.

Starting Material (B)

Starting material (B) in the curable silicone composition is an aromatic compound having two silicon bonded hydrogen atoms per molecule and a molecular weight less than 1,000 g/mol, alternatively less than 900 g/mol. At the same time, molecular weight of starting material (B) may be at least 194 g/mol. Alternatively, starting material (B) may have a molecular weight of 194 g/mol to <1,000 g/mol; alternatively 194 g/mol to <900 g/mol; alternatively 194 g/mol to 800 g/mol; alternatively 194 g/mol to 700 g/mol; alternatively 194 g/mol to 600 g/mol; alternatively 194 g/mol to 550 g/mol; alternatively 194 g/mol to 350 g/mol. Starting material (B) may be selected from the group consisting of a siloxane oligomer of formula (B-I):

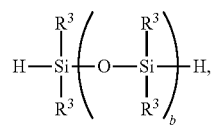

a organosilicon oligomer of formula (B-II):

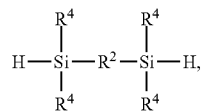

and a combination of both the siloxane oligomer and the organosilicon oligomer. In formulas (B-I) and (B-II), $R^2$ and $R^3$ are as described above for starting material (A). Each $R^4$ is an independently selected alkyl group of 1 to 12 carbon atoms. Subscript b is an integer with a value of 1 to 3. Suitable alkyl groups for $R^4$ include methyl, ethyl, propyl (including iso-propyl and n-propyl), butyl (including iso-butyl, n-butyl, sec-butyl, and tert-butyl), pentyl (including cyclopentyl and linear and branched alkyl groups with 5 carbon atoms), hexyl (including cyclohexyl and linear and branched alkyl groups with 6 carbon atoms). Alternatively, the alkyl group for $R^4$ may be selected from the group consisting of methyl and ethyl, alternatively methyl.

Compounds of formula (B-I) are known in the art and are commercially available. For example, (B-I-1) 1,1,5,5-tetramethyl-3,3-diphenyltrisiloxane of formula

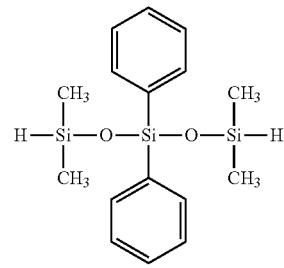 [SMILES: C[SiH](C)O[Si](O[SiH](C)C)(c1ccccc1)c1ccccc1]

(332 g/mol) and (B-I-2) 1,1,7,7,-tetramethyl-3,3,5,5,-tetraphenyltetrasiloxane of formula

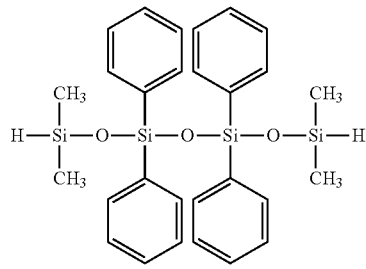 [SMILES: C[SiH](C)O[Si](O[Si](O[SiH](C)C)(c1ccccc1)c1ccccc1)(c1ccccc1)c1ccccc1]

(530 g/mol) are commercially available from various sources including Gelest, Inc. and Sigma-Aldrich, Inc. Compounds of formula (B-II) are also known in the art and are commercially available. For example, (B-II-1) 1,4-bis(dimethylsilyl)benzene of formula

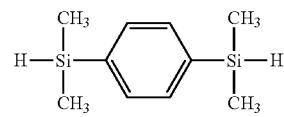

(194 g/mol) is also commercially available from various sources including Gelest, Inc. and Sigma-Aldrich, Inc.

Starting material (B) may be one compound or a combination of two or more of the compounds described above. For example, starting material (B) may be a combination of (B-I-1) 1,1,5,5-tetramethyl-3,3-diphenyltrisiloxane and (B-I-2) 1,1,7,7,-tetramethyl-3,3,5,5,-tetraphenyltetrasiloxane. Alternatively, starting material (B) may be a combination of (B-I-1) 1,1,5,5-tetramethyl-3,3-diphenyltrisiloxane and (B-II-1) 1,4-bis(dimethylsilyl)benzene. Alternatively, starting material (B) may be a combination of (B-I-2) 1,1,7,7,-tetramethyl-3,3,5,5,-tetraphenyltetrasiloxane and (B-II-1) 1,4-bis(dimethylsilyl)benzene.

Starting material (A) is used in the composition in an amount of 10 parts by mass to 90 parts by mass. Starting material (B) in the composition is used in the composition in an amount of 90 parts by mass to 10 parts by mass. The amount of starting material (A) and the amount of starting material (B) combined=100 parts by mass.

Starting Material (C)

Starting material (C) is an alkenyl functional polyorganosilicate resin. The alkenyl functional polyorganosilicate resin may have average unit formula (C-I): $(R^4{}_3SiO_{1/2})_c(R^1R^4{}_2SiO_{1/2})_d(SiO_{4/2})_e(HO_{1/2})_f$, where $R^1$ and $R^4$ are as described above and subscripts c, d, e, and f represent mole fractions. In formula (C-I), subscript $c≥0$, subscript $d>0$; $0.3≤(c+d)≤0.7$; $0.3≤e≤0.7$; and $0≤f≤0.05$; with the proviso that a quantity $(c+d+e+f)=1$; and the alkenyl functional polyorganosilicate resin of average formula (C-I) has a number average molecular weight of 1,500 g/mol to 5,000 g/mol measured by GPC. The alkenyl functional polyorganosilicate resin may be free of trifunctional units, e.g., units of formula $(R^1SiO_{3/2})$ and/or $(R^4SiO_{3/2})$.

Alternatively, the alkenyl functional polyorganosilicate resin may have average unit formula (C-II): $(R^4_3SiO_{1/2})_m(R^1R^4_2SiO_{1/2})_n(R^6SiO_{3/2})_o(SiO_{4/2})_p(HO_{1/2})_q$, where $R^1$ and $R^4$ are as described above, $R^6$ is an aryl group of 6 to 20 carbon atoms; and subscripts m, n, o, p, and q represent mole fractions. In formula (C-II), subscript $m≥0$, subscript $n>0$; $0.3≤(m+n)≤0.7$; $0≤o≤0.3$; $0.3≤p≤0.7$; and $0≤q≤0.05$; with the provisos that a quantity $(m+n+o+p+q)=1$; and the alkenyl functional polyorganosilicate resin of formula (C-II) has a number average molecular weight of 1,500 g/mol to 5,000 g/mol measured by GPC. Suitable aryl groups for $R^6$ may include phenyl, tolyl, xylyl, naphthyl, benzyl, and 2-phenylethyl. Alternatively, the aryl group for $R^6$ may be phenyl.

A polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having triorganosiloxy (M) units and silicate (Q) units. The resulting copolymers generally contain from 2 to 5 percent by weight of hydroxyl groups. The concentration of silicon bonded hydroxyl groups present in the polyorganosilicate resin may be determined using FTIR spectroscopy according to ASTM Standard E-168-16.

When prepared, the polyorganosilicate resin comprises the M and Q units described above, and the polyorganosilicate resin further comprises units with silanol (silicon bonded hydroxyl) groups and may comprise neopentamer of formula $Si(OSiR^M_3)_4$, where $R^M$ is a monovalent hydrocarbyl group. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as $\{M(resin)+M(neopentamer)\}/\{Q(resin)+Q(neopentamer)\}$ and represents the molar ratio of the total number of triorganosiloxy groups (M units) of the resinous and neopentamer portions of the polyorganosilicate resin to the total number of silicate groups (Q units) in the resinous and neopentamer portions.

The number average molecular weight (Mn) of the polyorganosilicate resin depends on various factors including the types of hydrocarbyl groups represented by $R^M$ that are present. The Mn of the polyorganosilicate resin refers to the number average molecular weight measured using gel permeation chromatography (GPC) according to the procedure in U.S. Pat. No. 9,593,209 at col. 31, Reference Example 1. Alternatively, the peak representing the neopentamer may be excluded from the measurement. The Mn of the polyorganosilicate resin may be at least 1,500 g/mol, alternatively at least 2,000 g/mol; while at the same time the Mn of the polyorganosilicate resin may be up to 5,000 g/mol; alternatively up to 4,500 g/mol. Alternatively, Mn of the polyorganosilicate resin may be 1,500 g/mol to 5,000 g/mol; alternatively 2,000 g/mol to 4,500 g/mol; and alternatively 2,500 g/mol to 4,000 g/mol.

Silicon bonded hydroxyl groups formed during preparation of the polyorganosilicate resin can be converted to trihydrocarbyl siloxane groups by reacting the silicone resin with an endblocking agent, e.g., a silane, disiloxane, or disilazane, containing the appropriate terminal group. Silanes containing hydrolyzable groups may be added in molar excess of the quantity required to react with the silicon bonded hydroxyl groups on the polyorganosilicate resin. The alkenyl functional polyorganosilicate resin described above may be prepared by reacting the product of Daudt, et al. with an alkenyl group-containing endblocking agent and an endblocking agent free of aliphatic unsaturation, in an amount sufficient to provide, e.g., from 3 to 30 mole percent of alkenyl groups to the resin. Suitable endblocking agents are known in the art and exemplified in U.S. Pat. Nos. 4,584,355; 4,591,622; and 4,585,836. A single endblocking agent or a mixture of such agents may be used to prepare such alkenyl functional polyorganosilicate resin.

Starting material (C) may be one resin or a combination of two or more of the resins described above. Starting material (C) is used in the composition in an amount sufficient to provide of 10 parts by mass to 130 parts by mass, per 100 parts by mass of starting material (A) and starting material (B) combined. Alternatively, the amount of starting material (C) may be at least 10, alternatively at least 30, alternatively at least 40, alternatively at least 50, and alternatively at least 60 parts by mass, per 100 parts by mass of starting material (A) and starting material (B) combined. At the same time, the amount of starting material (C) may be up to 130, alternatively up to 120, alternatively up to 100, alternatively up to 90 parts by mass, and alternatively up to 80 parts by mass, per 100 parts by mass of starting material (A) and starting material (B) combined. Alternatively, the amount of starting material (C) may be 30 to 130 parts by mass, per 100 parts by mass of starting material (A) and starting material (B) combined; alternatively 40 to 120; alternatively 50 to 100; and alternatively 60 to 90, parts by mass on the same basis.

Starting Material (D)

Starting material (D) is a polyorganosiloxane having a silicon bonded aliphatically unsaturated monovalent hydrocarbyl group, which may optionally be added to the composition described herein, e.g., for the purpose of improving flowability of the composition and/or to improve mechanical strength of the cured silicone pressure sensitive adhesive. Starting material (D) may comprise unit formula (D-I): $(R^5_3SiO_{1/2})_g(R^5_2SiO_{2/2})_h(R^5SiO_{3/2})_i(SiO_{4/2})_j$, where each $R^5$ is a monovalent hydrocarbyl group independently selected from the group consisting of an alkyl group of 1 to 12 carbon atoms, an alkenyl group of 2 to 12 carbon atoms, and an aryl group of 6 to 20 carbon atoms, with the proviso that 0.01 mol % to 1 mol % of all instances of $R^5$ are the alkenyl group; subscripts g, h, i, and j represent mole fractions with values such that $0<g≤0.4$; $0.6≤h≤1$; $0≤i≤0.03$; $0≤j≤0.03$; and a quantity $(g+h+i+j)=1$. Starting material (D) may have a viscosity of 1 mPa·s to 100,000 mPa·s at 25° C., alternatively 3 mPa·s to 50,000 mPa·s at 25° C., alternatively 5 mPa·s to 1,000 mPa·s at 25° C. Suitable alkyl groups and aryl groups for $R^5$ are as described above for $R^3$, and suitable alkenyl groups for $R^5$ are as described above for $R^1$. Alternatively, when the polyorganosiloxane is linear, subscript i and j may each be 0. Examples of polyorganosiloxanes for starting material (D) include:

i) α,ω-dimethylvinylsiloxy-terminated polydimethylsiloxane,
ii) α,ω-dimethylvinylsiloxy-terminated poly(dimethylsiloxane/methylvinylsiloxane),
iii) α,ω-dimethylvinylsiloxy-terminated polymethylvinylsiloxane,
iv) α,ω-trimethylsiloxy-terminated poly(dimethylsiloxane/methylvinylsiloxane),
v) α,ω-trimethylsiloxy-terminated polymethylvinylsiloxane,
vi) α,ω-dimethylvinylsiloxy-terminated poly(dimethylsiloxane/methylphenylsiloxane/methylvinylsiloxane),
vii) α,ω-dimethylvinylsiloxy-terminated poly(dimethylsiloxane/methylphenylsiloxane),
viii) α,ω-dimethylvinylsiloxy-terminated poly(dimethylsiloxane/diphenylsiloxane),
ix) α,ω-phenyl,methyl,vinyl-siloxy-terminated polydimethylsiloxane,
x) α,ω-dimethylhexenylsiloxy-terminated polydimethylsiloxane,
xi) α,ω-dimethylhexenylsiloxy-terminated poly(dimethylsiloxane/methylhexenylsiloxane),
xii) α,ω-dimethylhexenylsiloxy-terminated polymethylhexenylsiloxane,
xiii) α,ω-trimethylsiloxy-terminated poly(dimethylsiloxane/methylhexenylsiloxane),
xiv) α,ω-trimethylsiloxy-terminated polymethylhexenylsiloxane,
xv) α,ω-dimethylhexenyl-siloxy terminated poly(dimethylsiloxane/methylphenylsiloxane/methylhexenylsiloxane),
xvi) α,ω-dimethylvinylsiloxy-terminated poly(dimethylsiloxane/methylhexenylsiloxane),
xvii) α,ω-dimethylhexenyl-siloxy-terminated poly(dimethylsiloxane/methylphenylsiloxane),
xviii) dimethylhexenyl-siloxy-terminated poly(dimethylsiloxane/diphenylsiloxane),
xix) 1,3-dihexyl-1,1,3,3-tetramethyldisiloxane, and
xx) a combination of two or more of i) to xix).

Methods of preparing polyorganosiloxanes described above for starting material (D), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups. Examples of such polyorganosiloxanes are commercially available from, e.g., Gelest Inc. of Morrisville, Pennsylvania, USA under the tradenames DMS-V00, DMS-V03, DMS-V05, DMS-V21, DMS-V22, DMS-V25, DMS-V-31, DMS-V33, DMS-V34, DMS-V35, DMS-V41, DMS-V42, DMS-V43, DMS-V46, DMS-V51, DMS-V52.

Starting material (D) may be one polyorganosiloxane, or a combination of two or more of the polyorganosiloxanes, described above. For example, starting material (D) may be selected from the group consisting of i) α,ω-dimethylvinylsiloxy-terminated polydimethylsiloxane, vii) α,ω-dimethylvinylsiloxy-terminated poly(dimethylsiloxane/methylphenylsiloxane), and a combination of both i) and vii).

Starting material (D) is optional. However, when present, the amount depends on various factors including the type and amount of starting material (A) and whether starting material (E) is present. The amount of starting material (D) may be selected such that viscosity of the composition does not exceed 100 mPa·s. When present, starting material (D) may be used in the composition in an amount >0 parts by mass, alternatively at least 0.1 parts by mass, and alternatively at least 10 parts by mass, per 100 parts by mass of starting material (A) and starting material (B) combined. At the same time, the amount of starting material (D) may be up to 52.5 parts by mass, alternatively up to 50 parts by mass, alternatively up to 40 parts by mass, alternatively up to 39 parts by mass, per 100 parts by mass of starting material (A) and starting material (B) combined. Alternatively, starting material (D) may be present in the composition in an amount of 0 to 52.5, alternatively 0 to 50 parts by mass, alternatively 0 to 45 parts by mass, alternatively 0 to 40 parts by mass, alternatively 1 to 39 parts by mass, alternatively 2 to 38 parts by mass, and alternatively 1 to 15 parts by mass, per 100 parts by mass of starting materials (A) and (B) combined.

Starting Material (E)

Starting material (E) is a reactive diluent that may optionally be added to the composition. The reactive diluent comprises a hydrocarbon compound comprising 8 to 18 carbon atoms and at least one aliphatic unsaturation, per molecule. The reactive diluent may be linear or branched, and the aliphatic unsaturation may be pendant or terminal. Examples of reactive diluents include: dodecene, tetradecene, hexadecene, octadecene, and combinations thereof. Alternatively, the reactive diluent may comprise an alkene comprising 8 to 18 carbon atoms having a terminal double bond. Alternatively, the reactive diluent comprises at least one alkene comprising 12 to 14 carbon atoms and a terminal double bond. Alternatively, the reactive diluent is tetradecene. Reactive diluents are known in the art, for example in U.S. Pat. No. 7,687,591 to Bhagwagar et al., at col. 5, lines 16-26; European Patent Publication EP 3 757 186 A1 to Hino, at paragraph [0025]; and PCT Publication WO2020/000389 to Cao et al. at paragraph [0027].

Starting material (E) is optional. However, when present, the amount depends on various factors including the type and amount of starting material (A) and whether starting material (D) is present. The amount of starting material (E) may be selected such that viscosity of the composition does not exceed 100 mPa·s. When present, starting material (E) may be used in the composition in an amount >0 parts by mass, alternatively at least 0.1 parts by mass, and alternatively at least 10 parts by mass, per 100 parts by mass of starting material (A) and starting material (B) combined. At the same time, the amount of starting material (D) may be up to 25 parts by mass, alternatively up to 20 parts by mass, and alternatively up to 15 parts by mass, per 100 parts by mass of starting material (A) and starting material (B) combined. Alternatively, starting material (D) may be present in the composition in an amount of 0 to 25 parts by mass, alternatively 3 to 23 parts by mass, alternatively 3 to 10 parts by mass, alternatively 10 to 23 parts by mass, per 100 parts by mass of starting material (A) and starting material (B) combined.

Starting Material (F)

Starting material (F) is an optional polyorganohydrogensiloxane that may be added to the composition to improve crosslinking. Starting material (F) may have unit formula (F-I): $(R^4_3SiO_{1/2})_t(HR^4_2SiO_{2/2})_u(R^4_2SiO_{2/2})_v(HR^4SiO_{2/2})_w(R^4SiO_{3/2})_x(HSiO_{3/2})_y(SiO_{4/2})_z$, where $R^4$ is as described above, subscripts t, u, v, w, x, y, and z represent the average number of each unit in the formula and have values such that $t≥0$, $u≥0$, $v≥0$, $w≥0$, $x≥0$, $y≥0$, $z≥0$, a quantity $(u+w+y)≥2$, and a quantity $(t+u+v+w+x+y+z)$ is sufficient to give the polyorganohydrogensiloxane a viscosity of 2 mPa·s to 1,000 mPa·s at 25° C., alternatively 5 mPa·s to 500 mPa·s at 25° C. Alternatively, subscript y may be 0 and subscript z may be 0.

Suitable polyorganohydrogensiloxanes for use herein are exemplified by:

(i) α,ω-dimethylhydrogensiloxy-terminated poly(dimethylsiloxane/methylhydrogensiloxane), (ii) α,ω-dimethylhydrogensiloxy-terminated polymethylhydrogensiloxane, (iii) α,ω-trimethylsiloxy-terminated poly(dimethylsiloxane/methylhydrogensiloxane), (iv) α,ω-trimethylsiloxy-terminated polymethylhydrogensiloxane, and (v) α-dimethylhydrogensiloxy-ω-trimethylsiloxy-terminated poly(dimethylsiloxane/methylhydrogensiloxane), (vi) α-dimethylhydrogensiloxy-ω-trimethylsiloxy-terminated polymethylhydrogensiloxane, (vii) a combination of two or more thereof. Alternatively, the polyorganohydrogensiloxane for starting material (F) may be selected from the group consisting of (iii) α,ω-trimethylsiloxy-terminated poly(dimethylsiloxane/methylhydrogensiloxane), (iv) α,ω-trimethylsiloxy-terminated polymethylhydrogensiloxane, and a combination of both (iii) and (iv).

Methods of preparing polyorganohydrogensiloxanes suitable for use herein, such as hydrolysis and condensation of organohalosilanes, are well known in the art, as exemplified in U.S. Pat. No. 2,823,218 to Speier, et al., U.S. Pat. No. 3,957,713 to Jeram et al., and U.S. Pat. No. 4,329,273 to Hardman, et al. Polyorganohydrogensiloxanes are also commercially available, such as those available from Gelest, Inc. of Morrisville, Pennsylvania, USA, for example, HMS-H271, HMS-071, HMS-993 HMS-301 and HMS-301 R, HMS-031, HMS-991, HMS-992, HMS-993, HMS-082, HMS-151, HMS-013, HMS-053, HPM-502, and HMS-HM271. The amount of starting material (F) may be 0 to 8 parts by mass, per 100 parts by mass of starting material (A) and (B) combined. Alternatively, starting material (F) may be present in an amount of >0 to 8 parts by mass, alternatively >0 to 2 parts by mass, alternatively 1 to 2 part by mass, per 100 parts by mass of starting material (A) and starting material (B) combined.

Starting materials (A), (B), (C), (D), (E), and (F), are used in the composition in amounts sufficient to provide a molar ratio of silicon bonded hydrogen atoms to alkenyl groups (SiH/Vi ratio) of at least 0.5/1, alternatively at least 0.6/1. At the same time, the amounts of starting materials (A), (B), (C), (D), (E), and (F) are sufficient to provide a molar ratio of silicon bonded hydrogen atoms to alkenyl groups up to 2.0/1, alternatively up to 1.5/1, and alternatively up to 1.0/1. This molar ratio is calculated by combining the silicon bonded hydrogen content of starting material (B) and, when present, starting material (F) and dividing by the combined amount of alkenyl groups in starting materials (A) and (C), and when present, starting materials (D) and (E).

Starting Material (G)

Starting material (G) in the composition is a hydrosilylation reaction catalyst. This catalyst will promote a reaction between the alkenyl groups in starting materials (A) and (C) and, when present, starting materials (D) and (E), and the silicon bonded hydrogen atoms in starting material (B) and, when present, starting material (F). Said catalyst comprises a platinum group metal. The platinum group metal may be selected from the group consisting of platinum, rhodium, ruthenium, palladium, osmium, and iridium. Alternatively, the platinum group metal may be platinum. The hydrosilylation reaction catalyst may be (G-I) a radiation activatable catalyst, i.e., capable of catalyzing hydrosilylation reaction after irradiation (exposure to actinic radiation, e.g., exposure to visible or UV light), (G-II) a hydrosilylation catalyst activatable by means other than irradiation, e.g., capable of catalyzing hydrosilylation reaction without irradiation, such as by heating, or (G-III) a combination of both (G-I) and (G-II).

Suitable radiation activatable catalysts for use as starting material (G-I) may be activated by exposure to radiation with a wavelength of 200 nm to 500 nm. Suitable radiation activatable hydrosilylation reaction catalysts include cyclopentadienyl platinum complexes such as η5-cyclopentadienyl)tri(α-alkyl)platinum (IV); cyclopentadienyltrimethylplatinum and trimethyl(methylcyclopentadienyl)platinum (IV), cyclooctadienyl platinum complexes such as η4-1,5-cyclooctadienediarylplatinum complexes; and Pt(II)-β diketonate complexes such as bis(acetylacetonato)platinum (II). Examples of cyclopentadienyl platinum complexes are known in the art and are disclosed, for example in U.S. Pat. No. 4,510,094 to Drahnak; U.S. Pat. No. 4,600,484 to Drahnak; U.S. Pat. No. 4,916,169 to Boardman et al.; U.S. Pat. No. 6,127,446 to Butts; U.S. Pat. No. 6,451,869 to Butts; U.S. Pat. No. 6,376,569 to Oxman et al.; U.S. Pat. No. 8,088,878 to Koellnberger; and CN101925608B. Cyclooctadienyl platinum complexes are disclosed, for example, in U.S. Pat. No. 6,046,250 to Boardman et al. Platinum (II) beta-diketonate catalysts are disclosed, for example, in EP0398701B1 to Oxman et al.; U.S. Pat. No. 8,642,674 to Ikeno; and CN104031602A. U.S. Patent Application Publication 2005/0154079 to Walker et al.; U.S. Patent Application Publication 2011/0171400A1 to Thompson et al. and JP 03865638 B2 to Ikeno each disclose various radiation activatable hydrosilylation reaction catalysts as well. Alternatively, the hydrosilylation reaction catalyst may be as described in JP 03865638 B2.

Alternatively, the hydrosilylation reaction catalyst may be (G-II) a hydrosilylation catalyst activatable by means other than irradiation. For example, (G-II) may be (G-II-1) the platinum group metal, described above; (G-II-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, platinum dichloride, and (G-II-3) a complex of a compound, (G-II-2), with an alkenyl functional organopolysiloxane, or (G-II-4) a platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst) and Pt(0) complex in tetramethyltetravinylcyclotetrasiloxane (Ashby's Catalyst). Alternatively, the hydrosilylation reaction catalyst may be (G-II-5) a compound or complex, as described above, microencapsulated in a resin matrix. Specific examples of suitable platinum-containing catalysts for (G-II) include chloroplatinic acid, either in hexahydrate form or anhydrous form, or a platinum-containing catalyst which is obtained by a method comprising reacting chloroplatinic acid with an aliphatically unsaturated organosilicon compound such as divinyltetramethyldisiloxane, or alkene-platinum-silyl complexes as described in U.S. Pat. No. 6,605,734 to Roy. These alkene-platinum-silyl complexes may be prepared, for example by mixing 0.015 mole (COD) PtCl$_2$ with 0.045 mole COD and 0.0612 moles HMeSiCl$_2$, where COD represents cyclooctadienyl and Me represents methyl. Other exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. Pat. No. 5,036,117 to Chung, et al.; and U.S. Pat. No. 5,175,325 to Brown; and EP 0 347 895 A to Togashi, et al. U.S. Patent Application Publication 2019/0367744 to Chevalier et al. discloses both (G-I) radiation activatable catalysts and (G-II) catalysts activatable by means other than radiation (e.g., heat activatable catalysts). Suitable hydrosilylation reaction catalysts for starting material (F-II) are commercially available, for example, SYL-OFF™ 4000 Catalyst and SYL-OFF™ 2700 are available from Dow Silicones Corporation of Midland, Michigan, USA.

Starting material (G) may be one hydrosilylation reaction catalyst or a combination of two or more of the hydrosilylation reaction catalysts described above. For example, starting material (G) may be a combination of (G-I) and (G-II), e.g., when both exposure to radiation and heating will be used to cure the composition. Alternatively, starting material (G) may be a combination of two or more radiation activatable catalysts, such as a combination of a cyclopentadienyl platinum complex and a Pt(II)-β diketonate complex. One skilled in the art would recognize that certain catalyst species may be activated by either irradiating or heating, as described herein and that when a combination of two or more catalysts is used, the catalyst species selected will differ from one another.

The amount of (G) the hydrosilylation reaction catalyst in the composition will depend on various factors including the selection of starting materials (A), (B), and (C), and when present (D), (E), and (F); and their respective contents of alkenyl groups and silicon bonded hydrogen atoms, and the amount of (H) hydrosilylation reaction inhibitor present in the composition, however, the amount of catalyst is sufficient to catalyze hydrosilylation reaction of SiH and alkenyl groups, alternatively the amount of catalyst is sufficient to provide at least 0.01 ppm, alternatively at least 0.05 ppm, alternatively at least 0.1 ppm, alternatively at least 0.5 ppm, and alternatively at least 1 ppm, by mass of the platinum group metal based on combined amounts of starting materials (A), (B), (C), (D), (E), (F), (G) and (H) in the composition. At the same time, the amount of catalyst is sufficient to provide up to 5,000 ppm, alternatively up 800 ppm, alternatively up to 500 ppm, and alternatively up to 100 ppm by mass of the platinum group metal, based on combined amounts of starting materials (A), (B), (C), (D), (E), (F), (G), and (H) in the composition. Alternatively, the amount of hydrosilylation reaction catalyst may be sufficient to provide 0.01 ppm to 5,000 ppm; alternatively 0.1 ppm to 800 ppm; alternatively 0.5 ppm to 500 ppm; and alternatively 1 ppm to 100 ppm; by mass of the platinum group metal, based on combined amounts of starting materials (A), (B), (C), (D), (E), (F), (G), and (H) in the composition.

Starting Material (H)

Starting material (H) is an optional hydrosilylation reaction catalyst inhibitor. The hydrosilylation reaction inhibitor may be added, for example, when the composition will be prepared as a one part composition or to extend pot life of the composition. Starting material (H) may be, for example, (H-I) an acetylenic alcohol, (H-II) a silylated acetylenic alcohol, (H-III) an ene-yne compound, (H-IV) a triazole, (H-V) a phosphine, (H-VI) a mercaptan, (H-VII) a hydrazine, (H-VIII) an amine, (H-IX) a fumarate, (H-X) a maleate, (H-XI) an ether, (H-XII) carbon monoxide, (H-XIII) an alkenyl functional organosiloxane oligomer (that differs from starting material A-II); or (H-XIV) a combination of two or more thereof. Alternatively, the hydrosilylation reaction inhibitor may be an acetylenic alcohol, such as ETCH; a fumarate such as diethyl fumarate; a maleate such as bis-(methoxymethyl)ethyl maleate; or a combination of two or more thereof.

Acetylenic alcohols are exemplified by dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and ETCH, and a combination thereof. Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above. The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy) dimethylphenylsilane, (3-phenyl-1-butyn-3-oxy) dimethylvinylsilane, (3-phenyl-1-butyn-3-oxy) dimethylhexenylsilane, (cyclohexyl-1-ethyn-1-oxy) dimethylhexenylsilane, (cyclohexyl-1-ethyn-1-oxy) dimethylvinylsilane, (cyclohexyl-1-ethyn-1-oxy) diphenylmethylsilane, (cyclohexyl-1-ethyn-1-oxy) trimethylsilane, and combinations thereof. The silylated acetylenic compound useful as the inhibitor herein may be prepared by methods known in the art, for example, U.S. Pat. No. 6,677,407 to Bilgrien, et al. discloses silylating an acetylenic alcohol described above by reacting it with a chlorosilane in the presence of an acid receptor.

Ene-yne compounds are exemplified by 3-methyl-3-penten-1-yne, 3,5-dimethyl-3-hexen-1-yne, and a combination thereof. Triazoles are exemplified by benzotriazole. Amines are exemplified by tetramethyl ethylenediamine, 3-dimethylamino-1-propyne, n-methylpropargylamine, propargylamine, and 1-ethynylcyclohexylamine. Fumarates include dialkyl fumarates such as diethyl fumarate, dialkenyl fumarates such as diallyl fumarate, dialkoxyalkyl fumarates such as bis-(methoxymethyl)ethyl fumarate. Maleates include dialkyl maleates such as diethyl maleate, dialkenyl maleates such as diallyl maleate, and dialkoxyalkyl maleates such as bis-(methoxymethyl)ethyl maleate. Alkenyl functional organosiloxane oligomers suitable for use as inhibitors are exemplified by 1,3-divinyl-1,3-diphenyl-1,3-dimethyldisiloxane of formula

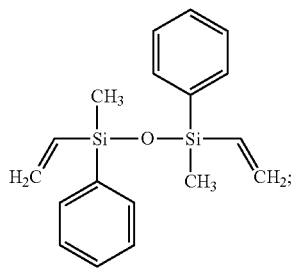 [SMILES: C=C[Si](C)(O[Si](C)(C=C)c1ccccc1)c1ccccc1]

1,3-divinyl-1,1,3,3-tetramethyldisiloxane; 1,3,5,7-tetramethyl-1,3,5,7-tetravinyl-cyclotetrasiloxane and a combination of two or more thereof. The compounds useful as inhibitors described above are commercially available, e.g., from Sigma-Aldrich Inc. or Gelest, Inc.

Starting material (H) may be one hydrosilylation reaction inhibitor or a combination of two or more of the hydrosilylation reaction inhibitors described above. The amount of inhibitor used in the composition will depend on various factors including the desired reaction rate, the particular inhibitor used, and the selection and amounts of each of starting materials (A) to (G). However, when present, the amount of inhibitor may be >0 parts by mass, alternatively at least 1 ppm by mass, based on combined amounts of starting materials (A), (B), (C), (D), (E), (F), (G), and (H) in the composition. At the same time, the amount of inhibitor may be up to 10,000 ppm, alternatively up to 1,000 ppm, alternatively up to 500 ppm by mass, based on combined amounts of starting materials (A), (B), (C), (D), (E), (F), (G), and (H) in the composition. Alternatively, the amount of inhibitor may be 0 to 10,000 ppm by mass, alternatively >0 to 1,000 ppm by mass, and alternatively 1 to 500 ppm by mass, based on combined amounts of starting materials (A), (B), (C), (D), (E), (F), (G), and (H) in the composition.

Other Optional Starting Materials

The composition may optionally comprise an additional starting material, such as a silicone tackifier, a fumed silica, a leveling agent, a surfactant (such as hydroxyalkyl or hydrosiloxy groups containing silicone polymer or resin), a wetting agent (moisturizing agent), a thickening agent, a rheology modifier, a non-reactive diluent (which is not intentionally removed during and/or after curing the composition) such as a plasticizer, a silicone oil, a hydrocarbon oil (such as an isoparaffin), or a combination of two or more thereof. The starting materials are optional and the type and amount of the additional starting material may be selected by one skilled in the art depending on various considerations including the end use of the composition and the cured product thereof.

Method of Making the Curable Silicone Composition

The composition may be prepared by a method comprising as mixing the starting materials at room temperature or elevated temperature. Alternatively, certain starting materials may be dissolved in a solvent to facilitate mixing, for example, starting material (C) the alkenyl functional polyorganosilicate resin and/or starting material (F), which are commercially available, may be provided in a solvent. When present, the solvent may be removed from a starting material and replaced with (E) the reactive diluent before combining with one or more other starting materials of the composition. Solvent removal may be by any convenient means, such as heating optionally under reduced pressure and optionally with a purge gas, such as nitrogen. Stripping and/or distillation may be used to remove solvent.

The starting materials may be added in any order, however, the hydrosilylation reaction inhibitor may be added before the hydrosilylation reaction catalyst, for example, when the composition will be prepared at elevated temperature and/or the composition will be prepared as a one part composition.

Alternatively, the composition may be prepared as a multiple part composition, for example, when the composition will be stored for a long period of time before use, e.g., up to 6 hours before coating the composition on a surface. In the multiple part composition, the hydrosilylation reaction catalyst is stored in a separate part from any starting material having a silicon bonded hydrogen atom, for example, (B) the aromatic compound having two silicon bonded hydrogen atoms per molecule and/or (F) the polyorganohydrogensiloxane, when present, and the parts are combined shortly before use of the composition.

For example, a multiple part composition may be prepared by combining starting materials comprising at least some of (A) the aromatic compound having two alkenyl groups per molecule, and when used (D) the alkenyl-functional polyorganosiloxane and/or (E) the reactive diluent; (B) the aromatic compound having two silicon bonded hydrogen atoms per molecule and, when used, (F) the polyorganohydrogensiloxane, and optionally one or more other additional starting materials described above to form a base part, by any convenient means such as mixing. A curing agent may be prepared by combining starting materials comprising at least some of (A) an aromatic compound having two alkenyl groups per molecule and when used (D) the alkenyl functional polydiorganosiloxane and/or (E) the reactive diluent, (G) the hydrosilylation reaction catalyst, and optionally one or more other additional starting materials described above by any convenient means such as mixing. The starting materials may be combined at ambient or elevated temperature. Starting material (H) the hydrosilylation reaction inhibitor may be included in one or more of the base part, the curing agent part, or a separate additional part. Starting material (C) the alkenyl-functional polyorganosilicate resin may be added to the base part, the curing agent part, or a separate additional part. When a two part composition is used, the weight ratio of amounts of base part to curing agent part may range from 1:1 to 10:1. The composition will cure via hydrosilylation reaction to form a silicone pressure sensitive adhesive.

Method of Use

The composition prepared as described above may be used to form an adhesive article comprising a silicone pressure sensitive adhesive layer on a surface of a substrate.

The method for forming the adhesive article comprises:
optionally 1) treating the surface of the substrate;
2) applying the composition described above to the surface of the substrate to form a film on the surface,
optionally 3) heating the film,
4) irradiating the film to form the silicone pressure sensitive adhesive layer on the surface of the substrate.
optionally 5) heating the silicone pressure sensitive adhesive layer.

The substrate can be any material that can withstand the conditions (described below) used to cure the composition to form the silicone pressure sensitive adhesive layer on the substrate. For example, any substrate that can withstand heat treatment at a temperature equal to or greater than 120° C., alternatively 150° C. is suitable. Examples of materials suitable for such substrates including glasses or plastic films such as polyimide (PI), polyetheretherketone (PEEK), polyethylene naphthalate (PEN), liquid-crystal polyarylate, polyamideimide (PAI), polyether sulfide (PES), polyethylene terephthalate (PET). The thickness of the substrate is not critical, however, the thickness may be 5 micrometers to 300 micrometers, alternatively 25 micrometers to 300 micrometers. The substrate may be transparent, alternatively, substrates which are not transparent may be used provided that they allow the PSA to be exposed to UV radiation. Alternatively, the substrate may be a component or layer of an (opto)electronic device such as a glass, a polarizer film, a thin film transistor (TFT), or a support such as a steel support to which the TFT will be attached.

Step 1)

To improve bonding of the silicone pressure sensitive adhesive layer to the substrate, the method for forming the adhesive article may optionally comprise treating the surface of the substrate before applying the composition. Treating the surface may be performed by any convenient means, such as applying a primer, or subjecting the substrate to corona-discharge treatment, etching, or plasma treatment before applying the composition to the surface so treated.

Step 2)

Applying the composition to the surface of the substrate can be performed by any convenient means. For example, the composition may be applied onto a substrate by gravure coater, offset coater, offset-gravure coater, roller coater, and reverse-roller coater. Alternatively, applying the composition to the surface of the substrate may be performed by a printing process such as screen printing, pin transfer, stencil printing, or inkjet printing. For example, use of the composition described above as an ink in an inkjet printing process is contemplated herein. The film applied on the surface of the substrate in step 2) by any means described herein may be continuous, i.e., uniformly covering all or a portion of the substrate, which cures to form a continuous layer on the surface of the substrate. Alternatively, the film may be discontinuous, for example when a printing process, such as inkjet printing, is used for applying the composition in a discontinuous layer on the surface of the substrate. A discontinuous film may be applied, for example, when it is desired to form a pattern on the surface of the substrate. Suitable inkjet printing apparatus are known in the art and commercially available, for example, see the apparatus described in U.S. Patent Application Publication 2019/0292394 to Linton et al. at paragraphs [0052] to [0055].

The amount of the composition to be applied to the surface substrate depends on various factors including whether a continuous or discontinuous silicone pressure sensitive adhesive layer is desired on the surface, the desired thickness of the silicone pressure sensitive adhesive layer to be formed, and the specific end use application for the adhesive article, however, the amount may be sufficient such that thickness of the silicone pressure sensitive adhesive may be >0 up to 100 micrometers, alternatively up to 50 micrometers; after cure via hydrosilylation reaction. Steps 2) to 5) may optionally be repeated to deposit additional composition, e.g., if a thicker silicone pressure sensitive adhesive is desired.

Step 4)

Irradiating the film in step 4) can be performed by any convenient means using a commercially available ultraviolet irradiation apparatus, for example, a face type or a conveyer belt-type ultraviolet irradiation apparatus, where a lamp such as a low-pressure mercury lamp, a medium-pressure mercury lamp, a high-pressure mercury lamp, an ultrahigh-pressure mercury lamp, a xenon lamp, a metal halide lamp, an electrodeless lamp, an ultraviolet light-emitting diode or the like is used as the radiation source. The ultraviolet irradiation dose may be 0.1 W/cm$^2$ to 10 W/cm$^2$ for 0.1 second to 120 seconds (=0.1 to 1200 J/cm$^2$).

Optional Steps 3) and 5)

Steps 3) and 5) are optional in the method described above, however, without one or both of step 3) and step 5), cure rate of the composition may be slower than desired by in some end use applications. Therefore, optional step 3) and/or optional step 5) may be included to increase cure rate. In step 3) and step 5), heating at a temperature of at least 30° C., alternatively at least 40° C., and alternatively at least 50° C. is performed. At the same time, the temperature may be up to 200° C., alternatively up to 150° C., and alternatively up to 100° C. Alternatively, heating may be performed at 30° C. to 200° C.; alternatively 40° C. to 150° C., and alternatively 50° C. to 100° C. Heating is performed for a time sufficient to transfer heat to the film or layer and the exact time will depend on various factors such as the temperature selected, thickness of the layer and whether a hydrosilylation reaction inhibitor is used. Conventional heating apparatus such as a box oven, reflow, (near) infrared lamp, or (near) infrared light emitting diodes (NIR-LEDs) may be used.

After step 4), or when present step 5), the silicone pressure sensitive adhesive layer has formed by curing the composition. The method may further comprise contacting the surface of an adherend and the cured silicone pressure sensitive adhesive opposite the substrate to form a bond. The surface of the adherend may optionally be treated before contacting, using the treating methods described above for step 1).

EXAMPLES

These examples are intended to illustrate the invention to one of ordinary skill in the art and should not be interpreted to limit the scope of the invention set forth in the claims. Starting materials used in these examples are summarized below in Table 1.

TABLE 1

Starting Materials

| Starting Material | Chemical Description | Source |
|---|---|---|
| A-1 | DVB (Divinyl benzene, CAS#1321-74-0), with Vi content = 38.95% and Ph content = 768.1 mmol/100 g | Sigma-Aldrich |
| A-2 | 1,5-divinyl-3,3-diphenyl-1,1,5,5-tetramethyltrisiloxane (CAS#18586-22-6), with Vi content = 13.70% and Ph content = 519.9 mmol/100 g | Dow Silicones |
| B-1 | 1,1,5,5-Tetramethyl-3,3-diphenyltrisiloxane (CAS# 17875-55-7, SiH = 0.6%, Ph content = 601.3 mmol/100 g) | Dow Silicones |
| B-2 | 1,4-Bis(dimethylsilyl)benzene (CAS# 2488-01-9, SiH = 1.03%, Ph content = 515.46 mmol/100 g) | Tyoko Chemical Industry Co., Ltd |
| C-1 | Dimethylvinylated and trimethylated silica, CAS# 68988-89-6, normalized unit formula $M^{Vi}_{0.4}M_{0.40}Q_{0.56}$ where the subscripts represent mole fractions and the resin has Mw = 20,000, Mn = 5,000, and Vi content =1.6% | Dow Silicones, DOWSIL ™ 6-3444 |
| C-2 | Dimethylvinylated and trimethylated silica, CAS# 68988-89-6, normalized unit formula $M^{Vi}_{0.10}M_{0.40}Q_{0.50}$, where the subscripts represent mole fractions and the resin has Mw = 5,500, Mn = 3,000, and Vi content = 3.4% | Dow Silicones |
| D-1 | Dimethylvinyloxy-terminated polydimethylsiloxane with vinyl content = 7.49% (average unit formula $M^{Vi}D_{7.2}M^{Vi}$ where the subscript 7.2 represents average number of D units per molecule, normalized unit formula $(Me_2ViSiO_{1/2})_{0.217}(Me_2SiO_{2/2})_{0.783}$, where the subscripts represent mole fractions CAS# 68083-19-2), viscosity = 6.4 mPa · s | Dow Silicones |
| D-2 | Dimethylvinyloxy-terminated polydimethylsiloxane with vinyl content 0.09% (average unit formula $M^{Vi}D_{766}M^{Vi}$, where the subscript 766 represents average number of D units per molecule; normalized unit formula $(Me_2ViSiO_{1/2})_{0.003}(Me_2SiO_{2/2})_{0.997}$, where the subscripts represent mole fractions CAS# 68083-19-2), viscosity = 45,000 mPa · s | Dow Silicones |
| D-3 | Dimethylvinyloxy-terminated polydimethylsiloxane with vinyl content 0.44% (average unit formula $M^{Vi}D_{139}M^{Vi}$, where the subscript 139 represents average number of D units per molecule; normalized unit formula $(Me_2ViSiO_{1/2})_{0.014}(Me_2SiO_{2/2})_{0.986}$, where the subscripts represent mole fractions CAS# 68083-19-2), viscosity = 500 mPa · s | Dow Silicones |
| D-4 | Dimethylvinyloxy-terminated polyphenylmethylsiloxane with vinyl content 1.43% (average unit formula $M^{Vi}D^{Ph, Me}_{23}M^{Vi}$, where the subscript 23 represents average number of $D^{Ph, Me}$ units per molecule; normalized unit formula $(Me_2ViSiO_{1/2})_{0.080}(PhMeSiO_{2/2})_{0.920}$, where the subscripts represent mole fractions CAS#225927-21-9), viscosity = 2,000 mPa · s | Dow Silicones |
| E-1 | 1-Tetradecene (CAS# 1120-36-1) | Tyoko Chemical Industry Co., Ltd |
| F-1 | α,ω-trimethylsiloxy-terminated polymethylhydrogensiloxane, SiH content = 1.6%, viscosity = 20 cst (CAS# 63148-57-2) | Dow Silicones |
| F-2 | α,ω-trimethylsiloxy-terminated poly(dimethyl/methylhydrogen)siloxane copolymer, SiH content = 0.76%, viscosity = 5 cst CAS# 63148-57-2) | Dow Silicones |
| F-3 | α,ω-dimethylhydrogensiloxy- terminated polydimethylsiloxane, SiH = 0.124%, viscosity = 15 cst (CAS#70900-21-9) | Dow Silicones |
| G-1 | Trimethyl(methylcyclopentadienyl)platinum(IV) with Pt content = 61%, CAS # 94442-22-5 | HS-161 from Umicore Precious |

TABLE 1-continued

Starting Materials

| Starting Material | Chemical Description | Source |
|---|---|---|
| G-2 | Platinum, 1,3-diethenyl-1,1,3,3-tetramethyldisiloxane complexes, CAS#68478-92-2, Pt content = 4% | Metals Chemistry Dow Silicones |
| H-1 | Diethyl fumarate (CAS#623-91-6) | Sigma-Aldrich |
| H-2 | Bis-(methoxymethyl)ethyl maleate (CAS#102054-10-4, purity = 94%) | Dow Silicones |
| Optional-1 | Trimethylsiloxysilicate resin, $M_{0.40}Q_{0.56}$, OH % of SiOH = 3~4 wt %, Mn = 2700. used as a surfactant and silicone tackifier | Dow Silicones |

Reference Example 1—Preparation of Curable Silicone Compositions

In this Reference Example 1, samples of curable silicone compositions containing the starting materials in Table 1 in the amounts shown in Tables 2-4 were prepared as follows: The starting material (C) may be dissolved in solvents such as toluene and xylene due to high viscosity. To prepare solventless composition, for any starting material delivered in a solvent, the solvent could be evaporated and replaced with a reactive diluent to facilitate mixing. For example, to prepare Inv. 1, firstly, 21.51 g of the starting material (A-1) and 78.49 g of the starting material (B-1) were added to 103.22 g of a solution containing 77.42 g of starting material (C-1) dissolved in xylene (75 wt %). Then, solvents were removed under reduced pressure at 80° C. for 5 hours during nitrogen bubbling, and residual solvent was controlled under 10 ppm. After cooling to room temperature, 39.06 g of starting material (D-1) was added to the above mixture and mixed by an agitator for 10 minutes at room temperature. Additionally, 0.04 g of the starting material (F-1) was added to the mixture and mixed by an agitator for 10 minutes at room temperature. Comp. 7-12 and Inv. 2-18 were prepared in the same manner using the starting materials and amounts in the tables. Comp. 1-6 were prepared in the same manner except for the solvent evaporation process because it did not use any solvent containing intermediates such as (C-1) and (C-2).

Reference Example 2—Viscosity

In this Reference Example 2, viscosity of each sample of curable silicone compositions prepared according to Reference Example 1 was measured as follows: Viscosity was measured by a Brookfield DV1 VISCOMETER using CPA-40Z spindle at 25° C. The viscosity was measured for 2 minutes and torque was controlled at the range of 20~80%. The latest data was collected after measurement was completed. The results are shown below in Tables 2-4.

Reference Example 3—Adhesion Force

In this Reference Example 3, samples of the curable silicone compositions prepared as described above were cured and adhesion force of the resulting pressure sensitive adhesive layers were evaluated as follows: Each sample prepared as described above was applied as a film on a glass plate. A pressure sensitive adhesive layer was produced by UV irradiating followed by heating the film for 30 min at 80° C., thereby forming the layer with a thickness of 40 µm. The conditions for UV irradiating were Ultraviolet light at a UV illuminance of 10 J/cm$^2$ was irradiated from the top surface of the film with a 365 nm LED lamp (FireJet™ FJ100).

A strip of corona-treated polyethylene terephthalate (PET) film was placed on the obtained layer and bonded thereto by moving a rubber-lined pressure roller of 2 kg weight on the strip twice back and forth. The resulting laminate was aged for 1 day at RT. A layer of PET film was cut into tape strips 2.54 cm (1 inch) wide, and then the adhesion force (g/inch) required to peel the tape off from the glass plate by pulling at a speed of 2400 mm/min and an angle of 1800 was measured. The data was collected by multi-speed peeling tester (CKTS-770, CKSI Co., Ltd). The results are shown below in Tables 2-4.

Reference Example 4—Modulus

In this Reference Example 4, samples of the curable silicone compositions prepared as described above were cured and adhesion force of the resulting pressure sensitive adhesive layers were evaluated as follows: Each sample prepared as described above was poured into a mold (thickness=1 mm) and sandwiched between releasable films. The assembled samples were cured in the same manner as described above in Reference Example 3. After the releasable film was removed, the sample was mounted onto a parallel-plate geometry (25 mm) of a rheometer (AtonParr™ MCR-502). Then, the dynamic storage modulus (G') was collected at a fixed frequency of 1 Hz with a strain of 1.0% and a normal force of 0 N at 25° C.

Reference Example 5—Transmittance

Each sample prepared as described above was poured into a mold (thickness=50 um) and sandwiched between microslide glasses (Matsunami Glass Co., Ltd, Product #9213). The assembled samples were cured in the above same manner as described in Reference Example 3. The transmittance at 500 nm and the CIE (L, a, b) were measured by the method specified in ASTM D 1003 (UV-Visible Spectrophotometer, Konica Minolta CM-3600A, Reference=Matsunami Glass Co., Ltd, Product #9213). The results are shown below in Tables 2-4.

Reference Example 6—Inkjetting Performance

The sample of curable silicone compositions prepared according to Reference Example 1 was injected to the inkjet head (KM1024i 30 pl, supplied by KONICA MINOLTA, INC). The inkjet process operation was performed by Omni-Jet Series supplied by Unijet. The inkjet head operation temperature was 25° C. and a distance between the inkjet head and a substrate was 400 um. The substrate was 100 mm by 100 mm supplied from Corning™ Eagle glass. FIG. 1 shows an image of a drop of the curable silicone composition according to INV1. It demonstrates the drop is properly formed without tailing when dispensed from the inkjet head. The drop velocity and the volume are 2.56 m/s and 24 pl, respectively.

TABLE 2

| | Comparative Examples | | | | | | | | | | | |
|---|---|---|---|---|---|---|---|---|---|---|---|---|
| Starting Materials | 1 | 2 | 3 | 4 | 5 | 6 | 7 | 8 | 9 | 10 | 11 | 12 |
| A-1 (parts by mass) | | 0.00 | 18.95 | 0.00 | 29.94 | 0.00 | | | 14.41 | 0.00 | 0.00 | 18.18 |
| A-2 (parts by mass) | | 0.00 | 0.00 | 38.68 | 0.00 | 58.76 | | | 0.00 | 34.88 | 16.67 | 0.00 |
| B-1 (parts by mass) | | 100.00 | 81.05 | 61.32 | 70.06 | 41.24 | 100.00 | 100.00 | 85.59 | 65.12 | 83.33 | 81.82 |
| Combined Amounts of A and B | | 100.00 | 100.00 | 100.00 | 100.00 | 100.00 | 100.00 | 100.00 | 100.00 | 100.00 | 100.00 | 100.00 |
| C-1 (parts by mass) | | | | | | | 139.53 | 150.00 | 103.75 | 81.40 | 116.67 | 169.70 |
| D-1 (parts by mass) | 42.37 | 290.66 | 105.61 | 88.91 | 16.96 | 0.69 | 228.67 | 169.44 | 86.35 | 52.71 | 118.88 | 35.35 |
| F-1 (parts by mass) | 2.98 | 12.00 | 6.32 | 5.80 | 3.59 | 3.09 | | | | | | |
| F-3 (parts by mass) | 54.62 | | | | | | | | | | | |
| G-I-1 (parts by mass) | 0.03 | 0.14 | 0.07 | 0.07 | 0.04 | 0.04 | 0.07 | 0.06 | 0.05 | 0.04 | 0.05 | 0.04 |
| Combined Amounts of total (A) to (G) | 100.00 | 402.80 | 212.00 | 194.78 | 120.60 | 103.81 | 468.28 | 419.50 | 290.15 | 234.15 | 335.60 | 305.08 |
| Calculations | | | | | | | | | | | | |
| Pt (ppm) per total (A) to (G) | 212 | 212 | 212 | 212 | 212 | 212 | 212 | 212 | 212 | 212 | 212 | 212 |
| SiH/Vi of all components | 0.98 | 0.98 | 1.04 | 1.04 | 1.00 | 0.99 | 0.82 | 1.04 | 0.99 | 1.03 | 1.01 | 1.02 |
| Phenyl content [mmol/100 g] of total (A), (B), (C), (D), (E) and (F) | 0 | 149 | 299 | 293 | 540 | 533 | 128 | 143 | 215 | 245 | 175 | 207 |
| Resin amount per 100 part of (A) + (B): = [C]/[(A) + (B)] | 0.0 | 0.0 | 0.0 | 0.0 | 0.0 | 0.0 | 139.5 | 150.0 | 103.7 | 81.4 | 116.7 | 169.7 |
| Test Results | | | | | | | | | | | | |
| Viscosity (mPa · s) at 25° C. | 13.4 | 8.3 | 6.2 | 12.9 | 3.6 | 11.1 | 21.2 | 29.4 | 21.1 | 47.6 | 58.3 | 212.6 |
| Storage Modulus [G'], (Pa) | 1.8E+05 | 3.7E+04 | 3.5E+04 | 3.5E+04 | 7.7E+03 | 8.6E+04 | 5.5E+04 | 8.5E+04 | 1.2E+04 | 5.1E+04 | 1.8E+04 | 1.7E+05 |
| Average adhesion (gf/in) | 0.7 | 1.7 | 3.2 | 2.2 | 65.9 | 43.3 | 8.7 | 12.7 | 30.0 | 25.8 | 11.4 | 706.2 |

TABLE 3

| | Working Examples | | | | | | | | | |
|---|---|---|---|---|---|---|---|---|---|---|
| Starting Materials | INV1 | INV2 | INV3 | INV4 | INV5 | INV6 | INV7 | INV8 | INV9 | INV10 |
| A-1 (parts by mass) | 21.51 | 25.86 | 27.34 | 26.50 | | | | | | |
| A-2 (parts by mass) | | | | | 50.63 | 49.39 | 50.31 | 51.43 | 43.85 | 44.68 |
| B-1 (parts by mass) | 78.49 | 74.14 | 72.66 | 73.50 | 49.38 | 50.61 | 49.69 | 48.57 | 56.15 | 51.06 |
| B-2 (parts by mass) | | | | | | | | | | 4.26 |
| Combined Amounts of A and B | 100.00 | 100.00 | 100.00 | 100.00 | 100.00 | 100.00 | 100.00 | 100.00 | 100.00 | 100.00 |
| C-1 (parts by mass) | 77.42 | 62.07 | 56.25 | 74.73 | 56.25 | 73.31 | 54.35 | 30.00 | 75.71 | 76.60 |
| D-1 (parts by mass) | 39.06 | 11.49 | 1.04 | 3.12 | | | 1.96 | 0.86 | 35.99 | 37.59 |
| G-I-1 (parts by mass) | 0.04 | 0.04 | 0.04 | 0.04 | 0.04 | 0.04 | 0.04 | 0.04 | 0.04 | 0.04 |
| Combined Amounts of total (A) to (G) | 216.53 | 173.60 | 157.32 | 177.89 | 156.29 | 173.35 | 156.35 | 130.90 | 211.75 | 214.22 |
| Calculations | | | | | | | | | | |
| Pt (ppm) per total (A) to (G) | 212 | 212 | 212 | 212 | 213 | 213 | 212 | 212 | 212 | 212 |
| SiH/Vi of all components | 1.00 | 0.99 | 1.00 | 0.99 | 1.00 | 1.00 | 1.00 | 1.02 | 0.90 | 0.91 |
| Phenyl content [mmol/100 g] of total (A), (B), (C), (D), (E) and (F) | 294 | 371 | 411 | 363 | 358 | 324 | 358 | 427 | 267 | 262 |
| Resin amount per 100 part of (A) + (B): = [C]/[(A) + (B)] | 77.4 | 62.1 | 56.3 | 74.7 | 56.3 | 73.3 | 54.3 | 30.0 | 75.7 | 76.6 |
| Test Results | | | | | | | | | | |
| Viscosity (mPa · s) at 25° C. | 16.4 | 15.2 | 13.0 | 17.7 | 40.7 | 79.2 | 51.9 | 20.0 | 37.4 | 34.4 |
| Storage Modulus [G'], (Pa) | 1.1E+04 | 5.4E+03 | 3.3E+04 | 8.8E+04 | 6.9E+05 | 7.7E+05 | 5.1E+05 | 4.1E+04 | 1.3E+04 | 5.5E+04 |
| Average adhesion (gf/in) | 292.5 | 1496.5 | 1940.0 | 1958.9 | 1262.4 | 296.0 | 617.1 | 814.1 | 564.9 | 425.3 |

TABLE 4

| Starting Materials | Working Examples | | | | | | | | | | | |
|---|---|---|---|---|---|---|---|---|---|---|---|---|
| | INV11 | INV12 | INV13 | INV14 | INV15 | INV16 | INV17 | INV18 | INV19 | INV20 | INV21 | INV22 |
| A-2 (parts by mass) | 41.83 | 45.45 | 47.17 | 46.30 | 33.52 | 46.30 | 46.30 | 45.87 | 41.37 | 40.80 | 38.64 | 41.44 |
| B-1 (parts by mass) | 58.17 | 54.55 | 52.83 | 53.70 | 66.48 | 53.70 | 53.70 | 54.13 | 58.63 | 59.20 | 61.36 | 58.56 |
| B-2 (parts by mass) | | | | | | | | | | | | |
| Combined Amounts of A and B | 100.00 | 100.00 | 100.00 | 100.00 | 100.00 | 100.00 | 100.00 | 100.00 | 100.00 | 100.00 | 100.00 | 100.00 |
| C-1 (parts by mass) | | | | | | | | | | | | 39.38 |
| C-2 (parts by mass) | 78.23 | 70.91 | 73.58 | 72.22 | 123.46 | 72.22 | 72.22 | 71.56 | 84.87 | 83.71 | 98.13 | |
| D-1 (parts by mass) | 23.70 | 12.12 | 14.46 | 12.34 | 1.49 | 12.34 | 12.34 | 11.31 | 9.90 | 2.51 | 1.79 | 52.07 |
| D-2 (parts by mass) | | | | | | | 1.85 | | | | | |
| D-3 (parts by mass) | | | | | | 1.85 | | | | | | |
| D-4 (parts by mass) | | | | | | | | 1.83 | | | | |
| E-1 (parts by mass) | | | | | | | | | 3.98 | 9.80 | 22.98 | |
| F-2 (parts by mass) | | | 1.89 | | | | | | | | 6.89 | |
| F-3 (parts by mass) | | | | 1.85 | | | | | | | | |
| F-1 (parts by mass) | | | | | | | | | | | | |
| G-1 (parts by mass) | 0.07 | 0.06 | 0.07 | 0.06 | 0.08 | 0.06 | 0.06 | 0.06 | 0.02 | 0.02 | 0.02 | 0.01 |
| Optional-1 (parts by mass) | | | | | | | | | | | | 18.94 |
| Combined Amounts of total A to G | 202.01 | 183.09 | 190.00 | 186.48 | 225.03 | 186.48 | 186.48 | 184.77 | 198.76 | 196.03 | 229.82 | 210.40 |
| Calculations | | | | | | | | | | | | |
| Pt (ppm) per total (A) to (G) | 212 | 212 | 212 | 212 | 212 | 212 | 212 | 212 | 50 | 50 | 50 | 31 |
| SiH/Vi of all components | 0.93 | 0.93 | 0.89 | 0.90 | 1.21 | 0.89 | 0.89 | 0.91 | 0.97 | 0.96 | 0.95 | 0.92 |
| Phenyl content [mmol/100 g] of total (A), (B), (C), (D), (E) and (F) | 281 | 308 | 296 | 302 | 255 | 302 | 302 | 312 | 286 | 290 | 248 | 296 |
| Resin amount per 100 part of (A) + (B): = [C]/[(A) + (B)] | 78.2 | 70.9 | 73.6 | 72.2 | 123.5 | 72.2 | 72.2 | 71.6 | 84.9 | 83.7 | 98.1 | 39.4 |
| Test Results | | | | | | | | | | | | |
| Viscosity (mPa · s) at 25° C. | 25.1 | 26.3 | 25.2 | 25.6 | 93.4 | 26.7 | 31.9 | 27.2 | 29.3 | 23.7 | 17.8 | 16.3 |
| Storage Modulus [G'], (Pa) | 1.7E+04 | 1.1E+04 | 2.6E+04 | 1.6E+04 | 2.3E+04 | 1.1E+04 | 1.1E+04 | 2.7E+04 | 1.2E+04 | 8.9E+03 | 7.8E+03 | 8.4E+03 |
| Average adhesion (gf/in) | 548.2 | 1344.1 | 419.0 | 900.6 | 953.0 | 331.0 | 382.0 | 953.2 | 489.5 | 817.8 | 121.2 | 242.0 |

TABLE 5

| | Working Examples (cont.) | | | |
|---|---|---|---|---|
| | INV23 | INV24 | INV25 | INV26 |
| A-2 (parts by mass) | 42.16 | 42.16 | 42.16 | 42.16 |
| B-1 (parts by mass) | 57.84 | 57.84 | 57.84 | 57.84 |
| Combined Amounts of A and B | 100.00 | 100.00 | 100.00 | 100.00 |
| C-2 (parts by mass) | 78.87 | 78.87 | 78.87 | 78.87 |
| D-1 (parts by mass) | 22.86 | 22.86 | 22.55 | 22.55 |
| G-I-1 (parts by mass) | 0.016 | 0.016 | | |
| G-II-1 (parts by mass) | | | 0.053 | 0.053 |
| H-1 (parts by mass) | | 0.020 | 0.061 | |
| H-2 (parts by mass) | | | | 0.061 |
| Combined Amounts of total A to G | 201.74 | 201.74 | 201.42 | 201.42 |
| Pt (ppm) per total (A) to (G) | 49 | 49 | 10 | 10 |
| SiH/Vi of all components | 0.92 | 0.92 | 0.92 | 0.92 |
| Phenyl content [mmol/100 g] of total (A), (B), (C), (D), (E) and (F) | 281 | 281 | 281 | 281 |
| Resin amount per 100 part of (A) + (B):=[C]/[(A) + (B)] | 78.87 | 78.87 | 78.87 | 78.87 |
| (H) Inhibitor (ppm) | 0.00 | 100 | 301 | 301. |
| Viscosity (mPa · s) at 25° C. | 25.0 | 24.8 | 24.8 | 24.9 |
| Cure Condition | 9 J/cm2 + 80° C. 30 min. | 9 J/cm2 + 80° C. 30 min. | 80° C. 30 min. | 80° C. 30 min. |
| Adhesion Strength (gf/in) | 538.2 | 490.3 | 487.0 | 495.5 |

TABLE 5-continued

Working Examples (cont.)

| | INV23 | INV24 | INV25 | INV26 |
|---|---|---|---|---|
| Initial Optical Property | | | | |
| Transmittance (%) | 99.5 | 99.4 | 99.6 | 99.7 |
| L* value | 99.72 | 99.69 | 99.73 | 99.62 |
| a* value | −0.43 | −0.44 | −0.42 | −0.43 |
| b* value | −0.01 | 0.00 | 0.00 | 0.00 |
| Optical Property after aging at 110° C. for 1000 hours | | | | |
| Transmittance (%) | 99.5 | 99.5 | 99.5 | 99.6 |
| L* value | 99.73 | 99.68 | 99.72 | 99.60 |
| a* value | −0.37 | −0.38 | −0.36 | −0.37 |
| b* value | −0.07 | 0.01 | 0.02 | 0.02 |

Comparative examples 1 to 6 show that omitting (C) the alkenyl functional polyorganosilicate resin resulted in poor adhesion force under the conditions tested. However, comparative example 12 shows that when the amount of (C) the resin was too high, viscosity of the composition was also higher than desirable for inkjet printing applications. Comparative examples 7 and 8 show that when starting material (A) was omitted and the amount of starting material (D) was too high, the total phenyl content was too low, and adhesion force was lower than desirable under the conditions tested. Comparative examples 9 to 11 show that when phenyl content was too low (≤245 mmol/100 g) in the composition, the resulting film had an undesirably low adhesion force under the conditions tested. Without wishing to be bound by theory, it is thought that the amount of starting material (D) should be 0 to ≤52.5 parts by mass, per 100 parts by mass of starting material (A) and starting material (B) combined, to have higher phenyl content in the composition. Without wishing to be bound by theory, it is thought that the aryl (phenyl) content should be >245 to 430 mmol/100 g based on the combined amount of the starting materials (A), (B), (C), (D), (E), and (F). Therefore, Example 1 to 22 (INV1 to INV22) demonstrate proper range of phenyl content and the amount of starting material (C) to have higher adhesion force (at least above 100 gf/in), which illustrates that combination effect of both aromatic compounds (starting material (A) and (B)) and alkenyl functional polyorganosilicate resin (starting material (C) is critical to achieve higher adhesion force maintaining low viscosity composition.

Industrial Applicability

The examples show that a curable silicone composition with viscosity <100 mPa·s at 25° C. can be prepared as described herein. Furthermore, when coated on a substrate and cured to form a silicone pressure sensitive adhesive layer by a dry bonding method, the silicone pressure sensitive adhesive has a modulus (G) at 25° C. with a value such that $10^3 < G < 10^6$ and an average adhesion >100 gf/in. Furthermore, working examples 1 to 8 in Table 3 showed that different species for starting materials (A) and (B) were operative under the conditions tested. In addition, working examples 23 to 26 showed high optical transmittance and optical stability at high temperature aging conditions. FIG. 1 showed appropriate inkjetting performance.

Problems to be Addressed

Inkjet printing of polymeric materials has been used to directly deposit organic thin film layers in the fabrication of OLEDs. Conventional solvents, such as toluene or xylene, do not work well for this deposition. The ink jet printing process can be used for formation of a layer or a fine pattern on either a flat or a curved surface. In particular, ink jet printing is advantageous in that the thickness of the printed layer can be reduced less than 50 um and unevenness of the printed layer or pattern can be prevented. However, known solventless silicone pressure sensitive adhesive compositions such as those disclosed in U.S. Pat. Nos. 7,687,591 and 8,754,174 have viscosities that are too high for use in an inkjet printing process to form a very thin adhesive layer (e.g., no more than 50 um) when the composition is cured.

Solution

The present silicone pressure sensitive adhesive composition has a viscosity <100 mPa s, alternatively less than 50 mPa s, and alternatively less than 30 mPa s at 25° C. measured by a Brookfield DV1 VISCOMETER using CPA-40Z spindle. This low viscosity makes the present silicone pressure sensitive adhesive composition suitable for use in an inkjet printing process. This silicone pressure sensitive adhesive composition can be printed on a substrate and cured to form a silicone pressure sensitive adhesive (layer or pattern) with a thickness of 50 um or less. This silicone pressure sensitive adhesive composition can be used in any optical bonding application such as an injection bonding method requiring low viscosity <100 mPa·s.

Definitions and Usage of Terms

All amounts, ratios, and percentages herein are by weight, unless otherwise indicated. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 6.

TABLE 6

Abbreviations

| Abbreviation | Definition |
|---|---|
| ° C. | degrees Celsius |
| cm | centimeter |
| COD | Cyclooctadienyl |
| cst | centistokes |
| D | A difunctional siloxane unit of formula $Me_2SiO_{2/2}$ |
| Da | Daltons |
| $D^{Ph, Me}$ | A difunctional siloxane unit of formula $PhMeSiO_{2/2}$ |
| $D^{Vi}$ | A difunctional siloxane unit of formula $ViMeSiO_{2/2}$ |
| ETCH | 1-ethynyl-1-cyclohexanol |
| FTIR | Fourier Transform-Infra Red |
| g | grams |
| gf | grams force |
| gf/in | grams force per inch |
| g/mol | grams per mole |
| GPC | gel permeation chromatography |
| J | Joules |
| kg | kilograms |
| LCD | Liquid crystal display |
| M | A monofunctional siloxane unit of formula $Me_3SiO_{1/2}$ |
| Me | Methyl |
| min | minute |
| mL | milliliters |
| mm | millimeters |
| Mn | Number average molecular weight |
| mPa · s | milliPascal seconds |
| $M^{Vi}$ | A monofunctional siloxane unit of formula $ViMe_2SiO_{1/2}$ |
| NMR | Nuclear Magnetic Resonance |
| OLED | Organic light emitting diode |
| Ph | Phenyl |
| ppm | parts per million |
| PTFE | polytetrafluoroethylene |
| Q | A quadrifunctional siloxane unit (silicate unit) of formula $SiO_{4/2}$ |
| RT | Room temperature of 25 ± 5° C. |
| T | A trifunctional siloxane unit of formula $MeSiO_{3/2}$ |
| $T^{Vi}$ | A trifunctional siloxane unit of formula $ViSiO_{3/2}$ |
| μL | microliter |
| μm | micrometer |
| Vi | Vinyl |
| W | Watts |

Test Methods

The following test methods were used herein.

Viscosity was measured by a Brookfield DV1 VISCOMETER using CPA-40Z spindle at 25° C. The viscosity was measured during 2 minutes and torque was controlled at the range of 20~80%. The latest data was collected after measurement was completed.

Molecular weight was measured by gel permeation chromatography according to the following method; Samples were prepared in toluene at 0.5% w/v concentration, filtered with a 0.45 μm PTFE syringe filter, and analyzed against polystyrene standards. The relative calibration (3rd order fit) used for molecular weight determination was based on 16 polystyrene standards ranging in molecular weights from 580 to 2,610,000 Daltons. The chromatographic equipment consisted of a Waters 2695 Separations Module equipped with a vacuum degasser, a Waters 2414 differential refractometer and two (7.8 mm×300 mm) styragel HR columns (molecular weight separation range of 100 to 4,000,000) preceded by a styragel guard column (4.6×30 mm). The separation was performed using toluene programmed to flow at 1.0 mL/min., injection volume was set at 100 μL and columns and detector were heated to 45° C. Data collection was 60 min and processing was performed using Empower software. As used herein for resins, Mw (Weight Average Molecular Weight) and Mn (Number Average Molecular Weight) represent the molecular weight when the peak representing the neopentamer is excluded from the measurement.

The amount of the aliphatically unsaturated hydrocarbon group in the total monovalent hydrocarbon groups and the amount of the silicon-bonded hydrogen in each starting material was measured by analytical methods exemplified by nuclear magnetic resonance (NMR). Their average molecular formulas of the starting materials were determined by $^{29}$Si-NMR and $^{13}$C-NMR analysis. NMR apparatus: Fourier Transform Nuclear Magnetic Resonance Spectrometer Bruker 500 MHz AVANCE 3 NMR equipped with 10 mm Si-free probe/5 mm BBFO probe.

SiH/Vi Ratio was calculated from the following equation.

$$SiH/Vi \text{ Ratio} = \frac{\frac{\text{the total weight (g) of Hydrogen in the portion of the starting material } (B) \text{ and } (F)}{1 \text{ g/mol (MW of hydrogen)}}}{\frac{\text{the total weight (g) of Vinyl in the portion of the starting material } (A), (C), (D) \text{ and } (E)}{27 \text{ g/mol (MW of Vinyl)}}}$$

Phenyl Content in the starting material was calculated from the following equation. Total phenyl contents (mmol/g100 g) was calculated based on phenyl contents in the phenyl portion of starting (A), (B), (C), (D), (E) and (F) per total weight (100 g) of the starting material (A), (B), (C), (D), (E) and (F)

$$\text{Phenyl Content}\left(\frac{mmol}{100 \text{ g}}\right) = \frac{\text{the number of phenyl groups (mol) per 1 mole of the molecule}}{\text{the molecular weight (g) per 1 mole of the molecule}} \times \frac{1000 \text{ mmol}}{1 \text{ mol}} \times \frac{100 \text{ g}}{100 \text{ g}}$$

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18"

may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a curable silicone composition comprises:
(A) an aromatic compound having two alkenyl groups per molecule and a molecular weight less than 1,000 g/mol, in an amount of 10 parts by mass to 90 parts by mass, wherein the aromatic compound is selected from the group consisting of
an organic compound of formula (A-I): $R^1-R^2-R^1$, a siloxane oligomer of formula (A-II):

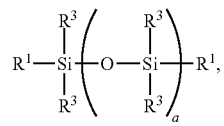

and
(A-III) a combination of both the organic compound of formula (A-I) and the siloxane oligomer of formula (A-II), where each $R^1$ is an independently selected alkenyl group of 2 to 12 carbon atoms, each $R^2$ is an arylene moiety of 6 to 20 carbon atoms, each $R^3$ is independently selected from the group consisting of an alkyl group of 1 to 12 carbon atoms and an aryl group of 6 to 20 carbon atoms, with the proviso that 15 mole % to 50 mole % of all instances of $R^3$ are aryl groups and 50 mole % to 85 mole % of all instances of $R^3$ are alkyl groups; and subscript a is an integer with a value of 2 to 3;
(B) an aromatic compound having two silicon bonded hydrogen atoms per molecule and a molecular weight less than 1,000 g/mol, in an amount of 90 parts by mass to 10 parts by mass;
with the proviso that the amount of starting material (A) and the amount of starting material (B) combined=100 parts by mass;
(C) an alkenyl functional polyorganosilicate resin in an amount of 10 parts by mass to 130 parts by mass, per 100 parts by mass of starting material (A) and starting material (B) combined;
optionally (D) an alkenyl functional polydiorganosiloxane in an amount of 0 to 52.5 parts by mass, per 100 parts by mass of starting material (A) and starting material (B) combined;
optionally (E) a reactive diluent comprising a hydrocarbon compound of 8 to 18 carbon atoms with at least one aliphatically unsaturated group per molecule, in an amount of 0 to 25 parts by mass of starting material (A) and starting material (B) combined;
optionally (F) a polyorganohydrogensiloxane in an amount of 0 to 8 parts by mass, per 100 parts by mass of starting material (A) and starting material (B) combined;

with the provisos that starting materials (A), (B), (C), (D), (E), and (F) are present in amounts sufficient to provide a molar ratio of silicon bonded hydrogen atoms/alkenyl groups (SiH/Vi ratio) of 0.5/1 to 2/1 and an aryl content of 246 mmol/100 g to 450 mmol/100 g;
(G) a hydrosilylation reaction catalyst in an amount sufficient to provide 0.1 ppm to 5,000 ppm by mass of a platinum group metal, based on combined amounts of starting materials (A), (B), (C), (D), (E), (F), (G) and (H);
optionally (H) a hydrosilylation reaction inhibitor in an amount of 0 to 10,000 ppm by mass, based on combined amounts of starting materials (A), (B), (C), (D), (E), (F), (G) and (H).

In a second embodiment, in the composition of the first embodiment, the compound of formula (A-I) is selected from the group consisting of divinyl benzene, diallyl benzene, and a combination thereof.

In a third embodiment, in the composition of the first embodiment, the compound of formula (A-II) is selected from the group consisting of 1,5-divinyl-3,3-diphenyl-1,1,5,5-tetramethyltrisiloxane; 1,5-divinyl-3-phenylpentamethyltrisiloxane; and a combination thereof.

In a fourth embodiment, in the composition of any one of the first to third embodiments, starting material (B) has formula (B-I).

In a fifth embodiment, in the composition of the fourth embodiment, the siloxane oligomer of formula (B-I) is selected from the group consisting of 1,1,5,5-tetramethyl-3,3-diphenyltrisiloxane; 1,1,7,7,-tetramethyl-3,3,5,5,-tetraphenyltetrasiloxane, and a combination thereof.

In a sixth embodiment, in the composition of any one of the first to third embodiments, the organosilicon oligomer has formula (B-II).

In a seventh embodiment, in the composition of the sixth embodiment, the siloxane organic hybrid oligomer of formula (B-II) comprises 1,4-bis(dimethylsilyl)benzene.

In an eighth embodiment, in the composition of any one of the first to seventh embodiments, the alkenyl functional polyorganosilicate resin has average formula (C-I): $(R^4{}_3SiO_{1/2})_c(R^1R^4{}_2SiO_{1/2})_d(SiO_{4/2})_e(HO_{1/2})_f$, where each $R^1$ is an independently selected alkenyl group of 2 to 12 carbon atoms, each $R^4$ is an independently selected alkyl group of 1 to 12 carbon atoms, subscripts c, d, e, and f represent mole fractions, c≥0, subscript d>0, 0.3≤(c+d)≤0.7; 0.3≤e≤0.7; and 0≤f≤0.05; with the proviso that a quantity (c+d+e+f)=1; and the alkenyl functional polyorganosilicate resin has average formula has a number average molecular weight of 1,500 g/mol to 5,000 g/mol measured by GPC.

In a ninth embodiment, in the composition of any one of the first to seventh embodiments, the alkenyl functional organosilicate resin has average formula (C-II): $(R^4{}_3SiO_{1/2})_m(R^1R^4{}_2SiO_{1/2})_n(R^6SiO_{3/2})_o(SiO_{4/2})_p(HO_{1/2})_q$, where each $R^1$ is an independently selected alkenyl group of 2 to 12 carbon atoms, each $R^4$ is an independently selected alkyl group of 1 to 12 carbon atoms, $R^6$ is an aryl group of 6 to 20 carbon atoms; and subscripts m, n, o, p, and q represent mole fractions with values such that m≥0, n>0; 0.3≤(m+n)≤0.7; 0≤o≤0.3; 0.3≤p≤0.7; and 0≤q≤0.05; with the provisos that a quantity (m+n+o+p+q)=1; and the alkenyl functional polyorganosilicate resin has a number average molecular weight of 1,500 g/mol to 5,000 g/mol measured by GPC.

In a tenth embodiment, in the composition of the eighth embodiment or the ninth embodiment, each $R^1$ is vinyl, each $R^4$ is methyl, and $R^6$ is phenyl.

In an eleventh embodiment, in the composition of any one of the first to tenth embodiments, starting material (D) is present in an amount of >0 to 40 parts by mass. In a twelfth embodiment, in the composition of any one of the first to eleventh embodiments, starting material (D) is present, and starting material (D) is selected from the group consisting of α,ω-dimethylvinylsiloxy-terminated polydimethylsiloxane, α,ω-dimethylvinylsiloxy-terminated poly(dimethylsiloxane/methylphenylsiloxane), and a combination of both α,ω-dimethylvinylsiloxy-terminated polydimethylsiloxane and α,ω-dimethylvinylsiloxy-terminated poly(dimethylsiloxane/methylphenylsiloxane).

In a twelfth embodiment, in the composition of any one of the first to eleventh embodiments, starting material (E) is present and comprises 1-tetradecene.

In a thirteenth embodiment, in any one of the first to twelfth embodiments, starting material (F) is present in an amount >0 to 2 parts by mass.

In an fourteenth embodiment, in the composition of any one of the first to thirteenth embodiments, starting material (F) is present, and starting material (F) is selected from the group consisting of α,ω-trimethylsiloxy-terminated poly(dimethylsiloxane/methylhydrogensiloxane); α,ω-trimethylsiloxy-terminated polymethylhydrogensiloxane; and a combination of both α,ω-trimethylsiloxy-terminated poly(dimethylsiloxane/methylhydrogensiloxane) and α,ω-trimethylsiloxy-terminated polymethylhydrogensiloxane.

In a fifteenth embodiment, in the composition of any one of the first to fourteenth embodiments, starting material (G) is selected from the group consisting of trimethyl(methylcyclopentadienyl)platinum(IV); platinum, 1,3-diethenyl-1,1,3,3-tetramethyldisiloxane complex; and a combination of both trimethyl(methylcyclopentadienyl)platinum(IV) and platinum, 1,3-diethenyl-1,1,3,3-tetramethyldisiloxane complex.

In a sixteenth embodiment, in the composition of any one of the first to fifteenth embodiments, starting material (H) is present, and starting material (H) is selected from the group consisting of diethyl fumarate; bis-(methoxymethyl)ethyl maleate; 1,3-divinyl-1,3-diphenyl-1,3-dimethyldisiloxane; 1,3-divinyl-1,1,3,3-tetramethyldisiloxane; 1,3,5,7-tetramethyl-1,3,5,7-tetravinyl-cyclotetrasiloxane and a combination of two or more thereof.

In a seventeenth embodiment, the composition of any one of the first to sixteenth embodiment is used in an inkjet printing process to form a silicone pressure sensitive adhesive.

In an eighteenth embodiment, the silicone pressure sensitive adhesive prepared by the inkjet printing process of the seventeenth embodiment is used to adhere a thin film transistor to a support.

The invention claimed is:

1. A curable silicone composition comprises:
    (A) an aromatic compound having two alkenyl groups per molecule and a molecular weight less than 1,000 g/mol, in an amount of 10 parts by mass to 90 parts by mass, wherein the aromatic compound is selected from the group consisting of
        an organic compound of formula (A-I): $R^1$—$R^2$—$R^1$, a siloxane oligomer of formula (A-II);

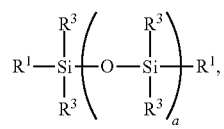

and
    (A-III) a combination of both the organic compound of formula (A-I) and the siloxane oligomer of formula (A-II), where each $R^1$ is an independently selected alkenyl group of 2 to 12 carbon atoms, each $R^2$ is an arylene moiety of 6 to 20 carbon atoms, each $R^3$ is independently selected from the group consisting of an alkyl group of 1 to 12 carbon atoms and an aryl group of 6 to 20 carbon atoms, with the proviso that 15 mole % to 50 mole % of all instances of $R^3$ are aryl groups and 50 mole % to 85 mole % of all instances of $R^3$ are alkyl groups; and subscript a is an integer with a value of 2 to 3;
    (B) an aromatic compound having two silicon bonded hydrogen atoms per molecule and a molecular weight less than 1,000 g/mol, in an amount of 90 parts by mass to 10 parts by mass;
        with the proviso that the amount of starting material (A) and the amount of starting material (B) combined=100 parts by mass;
    (C) an alkenyl functional polyorganosilicate resin in an amount of 10 parts by mass to 130 parts by mass, per 100 parts by mass of starting material (A) and starting material (B) combined;
    optionally (D) an alkenyl functional polydiorganosiloxane in an amount of 0 to 52.5 parts by mass, per 100 parts by mass of starting material (A) and starting material (B) combined;
    optionally (E) a reactive diluent comprising a hydrocarbon compound of 8 to 18 carbon atoms with at least one aliphatically unsaturated group per molecule, in an amount of 0 to 25 parts by mass of starting material (A) and starting material (B) combined;
    optionally (F) a polyorganohydrogensiloxane in an amount of 0 to 8 parts by mass, per 100 parts by mass of starting material (A) and starting material (B) combined;
        with the provisos that starting materials (A), (B), (C), (D), (E), and (F) are present in amounts sufficient to provide a molar ratio of silicon bonded hydrogen atoms/alkenyl groups (SiH/Vi ratio) of 0.5/1 to 2/1; and an aryl content of 246 mmol/100 g to 450 mmol/100 g;
    (G) a hydrosilylation reaction catalyst in an amount sufficient to provide 0.1 ppm to 5,000 ppm by mass of a platinum group metal, based on combined amounts of starting materials (A), (B), (C), (D), (E), (F), (G) and (H);
    optionally (H) a hydrosilylation reaction inhibitor in an amount of 0 to 10,000 ppm by mass, based on combined amounts of starting materials (A), (B), (C), (D), (E), (F), (G) and (H).

2. The composition of claim 1, where in formula (A-I) and formula (A-II), each $R^1$ is independently selected from the group consisting of vinyl, allyl, and hexenyl; each $R^2$ is independently selected from the group consisting of

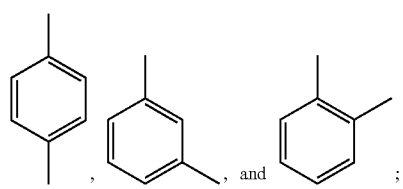

and each $R^3$ is independently selected from the group consisting of a methyl group and a phenyl group.

3. The composition of claim 1, where the compound of formula (A-I) is selected from the group consisting of divinyl benzene, diallyl benzene, and a combination thereof; and the compound of formula (A-II) is selected from the group consisting of 1,5-divinyl-3,3-diphenyl-1,1,5,5-tetramethyltrisiloxane; 1,5-divinyl-3-phenylpentamethyltrisiloxane; and a combination thereof.

4. The composition of claim 1, where starting material (B) is selected from the group consisting of a siloxane oligomer of formula (B-I):

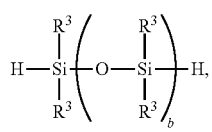

a organosilicon oligomer of formula (B-II):

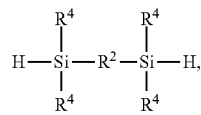

and a combination of both the siloxane oligomer and the organosilicon oligomer, where each $R^2$ is an arylene moiety of 6 to 20 carbon atoms, each $R^3$ is independently selected from the group consisting of an alkyl group of 1 to 12 carbon atoms and an aryl group of 6 to 20 carbon atoms, with the proviso that 15 mole % to 50 mole % of all instances of $R^3$ are aryl groups and 50 mole % to 85 mole % of all instances of $R^3$ are alkyl groups; each $R^4$ is an independently selected alkyl group of 1 to 12 carbon atoms, and subscript b is 1 to 3.

5. The composition of claim 4, where in formula (B-I) and formula (B-II), each $R^2$ is selected from the group consisting of

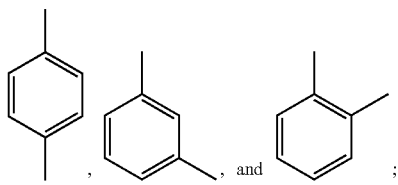

each $R^3$ is a methyl group or a phenyl group; and each $R^4$ is a methyl group.

6. The composition of claim 1, where starting material (B) comprises:
the siloxane oligomer of formula (B-I), where the siloxane oligomer of formula (B-I) is selected from the group consisting of 1,1,5,5-tetramethyl-3,3-diphenyltrisiloxane; 1,1,7,7,-tetramethyl-3,3,5,5,-tetraphenyltetrasiloxane, and a combination thereof; or the organosilicon oligomer of formula (B-II), where the siloxane organic hybrid oligomer of formula (B-II) comprises 1,4-bis(dimethylsilyl)benzene;
a combination of both the siloxane oligomer of formula (B-I) and the siloxane organic hybrid oligomer of formula (B-II).

7. The composition of claim 1, where the alkenyl functional polyorganosilicate resin has average formula (C-I): $(R^4{}_3SiO_{1/2})_c(R^1R^4{}_2SiO_{1/2})_d(SiO_{4/2})_e(HO_{1/2})_f$, where each $R^4$ is an independently selected alkyl group of 1 to 12 carbon atoms, subscripts c, d, e, and f represent mole fractions, $c \geq 0$, subscript $d>0$, $0.3 \leq (c+d) \leq 0.7$; $0.3 \leq e \leq 0.7$; and $0 \leq f \leq 0.05$; with the proviso that a quantity $(c+d+e+f)=1$; and the alkenyl functional polyorganosilicate resin has average formula has a number average molecular weight of 1,500 g/mol to 5,000 g/mol.

8. The composition of claim 1, where starting material (D) is present and has unit formula: $(R^5{}_3SiO_{1/2})_g(R^5{}_2SiO_{2/2})_h(R^5SiO_{3/2})_i(SiO_{4/2})_j$, where each $R^5$ is a monovalent hydrocarbon group independently selected from the group consisting of an alkyl group of 1 to 12 carbon atoms, an alkenyl group of 2 to 12 carbon atoms, and an aryl group of 6 to 20 carbon atoms, with the proviso that 0.01 mol % to 1 mol % of all instances of $R^5$ are the alkenyl group; subscripts g, h, i, j, and k represent mole fractions with values such that $0<g \leq 0.4$; $0.6 \leq h \leq 1$; $0 \leq i \leq 0.03$; $0 \leq k \leq 0.03$; and a quantity $(g+h+i+j)=1$; wherein starting material (D) has a viscosity of 1 mPa·s to 100,000 mPa·s at 25° C.

9. The composition of claim 1, where starting material (E) comprises a 1-alkene of 8 to 12 carbon atoms.

10. The composition of claim 1, where starting material (F) is present and has unit formula: $(R^4{}_3SiO_{1/2})_t(HR^4{}_2SiO_{1/2})_u(R^4{}_2SiO_{2/2})_v(HR^4SiO_{2/2})_w(R^4SiO_{3/2})_x(HSiO_{3/2})_y(SiO_{4/2})_z$, where each $R^4$ is an independently selected alkyl group of 1 to 12 carbon atoms; subscripts t, u, v, w, x, y, and z represent the average number of each unit in the formula and have values such that $t \geq 0$, $u \geq 0$, $v \geq 0$, $w \geq 0$, $x \geq 0$, $y \geq 0$, $z \geq 0$, a quantity $(u+w+y) \geq 2$, and a quantity $(t+u+v+w+x+y+z)$ is sufficient to give the polyorganohydrogensiloxane a viscosity of 2 mPa·s to 1,000 mPa·s at 25° C.

11. The composition of claim 1, where starting material (G) is selected from the group consisting of (G-I) a radiation activatable hydrosilylation reaction catalyst, (G-II) a hydrosilylation reaction catalyst activatable by means other than irradiation, or (G-III) a combination thereof.

12. The composition of any claim 1, where starting material (H) is present and is selected from the group consisting of acetylenic alcohols, silylated acetylenic alcohols, ene-yne compounds, triazoles, phosphines, mercaptans, hydrazines, amines, fumarates, maleates, ethers, carbon monoxide, and a combination of two or more thereof.

13. A method comprising:
optionally 1) treating a surface of a substrate,
2) applying the composition of claim 1 on the surface of the substrate, and
3) Curing the composition to form a silicone pressure sensitive adhesive on the surface.

14. The method of claim 13, further comprising:
optionally 4) treating a surface of an adherend, and
optionally 5) contacting the surface of the adherend and the silicone pressure sensitive adhesive opposite the substrate.

* * * * *